(12) United States Patent
Forutanpour et al.

(10) Patent No.: US 10,979,691 B2
(45) Date of Patent: Apr. 13, 2021

(54) CIRCULAR FISHEYE VIDEO IN VIRTUAL REALITY

(71) Applicant: QUALCOMM Incorporated, San Diego, CA (US)

(72) Inventors: Bijan Forutanpour, San Diego, CA (US); Ye-Kui Wang, San Diego, CA (US); Phi Hung Nguyen, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/495,730

(22) Filed: Apr. 24, 2017

(65) Prior Publication Data

US 2017/0339392 A1 Nov. 23, 2017

Related U.S. Application Data

(60) Provisional application No. 62/339,504, filed on May 20, 2016.

(51) Int. Cl.
| | |
|---|---|
| *H04N 13/161* | (2018.01) |
| *H04N 5/262* | (2006.01) |
| *H04N 19/597* | (2014.01) |
| *H04N 5/232* | (2006.01) |

(52) U.S. Cl.
CPC ....... *H04N 13/161* (2018.05); *H04N 5/23238* (2013.01); *H04N 5/2628* (2013.01); *H04N 19/597* (2014.11)

(58) Field of Classification Search
CPC .. H04N 13/161; H04N 19/597; H04N 5/2628; H04N 5/23238; H04N 5/2258
See application file for complete search history.

(56) References Cited

U.S. PATENT DOCUMENTS

| | | | |
|---|---|---|---|
| 6,005,611 A | 12/1999 | Gullichsen et al. | |
| 2003/0103063 A1 | 6/2003 | Mojaver et al. | |
| 2009/0167886 A1* | 7/2009 | Tonomura | G06T 3/0031 |
| | | | 348/222.1 |
| 2012/0201521 A1* | 8/2012 | Frojdh | H04N 19/46 |
| | | | 386/356 |

(Continued)

OTHER PUBLICATIONS

International Search Report and Written Opinion—PCT/US2017/029417—ISA/EPO—dated Jul. 17, 2017.

(Continued)

*Primary Examiner* — Tat C Chio
(74) *Attorney, Agent, or Firm* — Polsinelli LLP

(57) ABSTRACT

Provided are systems, methods, and computer-readable medium for including parameters that describe fisheye images in a 360-degree video with the 360-degree video. The 360-degree video can then be stored and/or transmitted as captured by the omnidirectional camera, without transforming the fisheye images into some other format. The parameters can later be used to map the fisheye images to an intermediate format, such as an equirectangular format. The intermediate format can be used to store, transmit, and/or display the 360-degree video. The parameters can alternatively or additionally be used to map the fisheye images directly to a format that can be displayed in a 360-degree video presentation, such as a spherical format.

46 Claims, 23 Drawing Sheets

(56) References Cited

U.S. PATENT DOCUMENTS

| | | | |
|---|---|---|---|
| 2014/0192151 A1* | 7/2014 | Wang ................... | H04N 19/46 |
| | | | 348/43 |
| 2015/0304665 A1* | 10/2015 | Hannuksela ......... | H04N 13/161 |
| | | | 375/240.02 |
| 2016/0073024 A1* | 3/2016 | Yamamoto ........... | H04N 5/2258 |
| | | | 348/36 |
| 2019/0141311 A1* | 5/2019 | Lee ..................... | H04N 13/194 |

OTHER PUBLICATIONS

Matsuyama T., et al., "Requirements for Standardisation of 3D Video", MPEG Meeting, Mar. 8, 2002, XP030037123, 11 pages.

\* cited by examiner

1800

OBTAINING 360-DEGREE VIDEO DATA CAPTURED BY AN OMNIDIRECTIONAL CAMERA, WHEREIN A VIDEO FRAME OF THE 360-DEGREE VIDEO DATA INCLUDES AN IMAGE OF A SCENE, AND WHEREIN, IN THE IMAGE, THE SCENE IS WARPED INTO A CIRCULAR REGION OF THE IMAGE
1802

OBTAINING PARAMETERS ASSOCIATED WITH THE OMNIDIRECTIONAL CAMERA, WHEREIN THE PARAMETERS DESCRIBE THE CIRCULAR REGION OF THE IMAGE
1804

ENCODING THE 360-DEGREE VIDEO DATA
1806

GENERATING ENCODED VIDEO DATA, WHEREIN THE ENCODED VIDEO DATA INCLUDES THE ENCODED 360-DEGREE VIDEO DATA AND THE PARAMETERS ASSOCIATED WITH THE OMNIDIRECTIONAL CAMERA
1808

OBTAINING ENCODED VIDEO DATA, WHEREIN THE ENCODED VIDEO DATA INCLUDES ENCODED 360-DEGREE VIDEO DATA CAPTURED BY AN OMNIDIRECTIONAL CAMERA AND PARAMETERS ASSOCIATED WITH THE OMNIDIRECTIONAL CAMERA
1902

DECODING THE ENCODED VIDEO DATA TO PRODUCE THE 360-DEGREE VIDEO DATA, WHEREIN A FRAME FROM THE 360-DEGREE VIDEO DATA INCLUDES AN IMAGE OF A SCENE, AND WHEREIN, IN THE IMAGE, THE SCENE IS WARPED INTO A CIRCULAR REGION OF THE IMAGE
1904

GENERATING A 360-DEGREE VIDEO PRESENTATION, WHEREIN GENERATING THE 360-DEGREE VIDEO PRESENTATION INCLUDES USING THE PARAMETERS TO MAP THE CIRCULAR REGION TO A 360-DEGREE FORMAT
1906

*FIG. 19*

CIRCULAR FISHEYE VIDEO IN VIRTUAL REALITY

CROSS-REFERENCES TO RELATED APPLICATIONS

This application claims the benefit of and priority to U.S. Provisional Application No. 62/339,504, filed on May 20, 2016, which is incorporated by reference herein in its entirety.

BRIEF SUMMARY 360-degree video can provide viewers an immersed experience. For example, 360-degree video can provide a viewer with a virtual reality experience, putting the viewer in a virtually different time and/or place. As another example, 360-degree video can provide a viewer with a first-person view of video content captured by a remote device (e.g., an unmanned aerial vehicle, or other device). One method for capturing 360-degree video is to use an omnidirectional camera. Omnidirectional cameras can capture a wide field of view with just a few lenses. The resulting images exhibit a fisheye effect.

In various implementations, provided are systems, methods, and computer-readable medium for including parameters that describe fisheye images in a 360-degree video with the 360-degree video. The 360-degree video can then be stored and/or transmitted as captured by the omnidirectional camera, without transforming the fisheye images into some other format. The parameters can later be used to map the fisheye images to an intermediate format, such as an equirectangular format. The intermediate format can be used to store, transmit, and/or display the 360-degree video. The parameters can alternatively or additionally be used to map the fisheye images directly to a format that can be displayed in a 360-degree video presentation, such as a spherical format.

According to at least one example, a method for processing video data is provided. The method includes obtaining 360-degree video data captured by an omnidirectional camera. A video frame of the 360-degree video data can include an image of a scene. In the image, the scene is warped into a circular region of the image. The method further includes obtaining parameters associated with the omnidirectional camera. The parameters can describe the circular region of the image. The method further includes encoding the 360-degree video data. The method further includes generating encoded video data. The encoded video data can includes the encoded 360-degree video data and the parameters associated with the omnidirectional camera.

In another example, an apparatus is provided that includes a memory a processor configured to obtain 360-degree video data captured by an omnidirectional camera. A video frame of the 360-degree video data can include an image of a scene. In the image, the scene is warped into a circular region of the image. The processor is configured to and can obtain parameters associated with the omnidirectional camera. The parameters can describe the circular region of the image. The processor is configured to and can encode the 360-degree video data. The processor is configured to and can generate encoded video data. The encoded video data can include the encoded 360-degree video data and the parameters associated with the omnidirectional camera.

In another example, a computer readable medium is provided having stored thereon instructions that, when executed by a processor, perform a method that includes: obtaining 360-degree video data captured by an omnidirectional camera. A video frame of the 360-degree video data can include an image of a scene. In the image, the scene is warped into a circular region of the image. The method further includes obtaining parameters associated with the omnidirectional camera. The parameters can describe the circular region of the image. The method further includes encoding the 360-degree video data. The method further includes generating encoded video data. The encoded video data can include the encoded 360-degree video data and the parameters associated with the omnidirectional camera.

In another example, an apparatus is provided that includes means for obtaining 360-degree video data captured by an omnidirectional camera. A video frame of the 360-degree video data can include an image of a scene. In the image, the scene is warped into a circular region of the image. The apparatus further includes means for obtaining parameters associated with the omnidirectional camera. The parameters can describe the circular region of the image. The apparatus further includes means for encoding the 360-degree video data. The apparatus further includes means for generating encoded video data. The encoded video data can include the encoded 360-degree video data and the parameters associated with the omnidirectional camera.

In some aspects, the scene is warped into one or more circular regions of the image. In these aspects, the parameters include a quantity of the one or more circular regions. In some aspects, the parameters include a horizontal coordinate of a center of the circular region. In some aspects, the parameters include a vertical coordinate of a center of the circular region. In some aspects, the parameters include a full radius value, wherein a full radius is a distance from a center of the circular region to an outside edge of the circular region. In some aspects, the parameters include a frame radius value, wherein a frame radius is a distance from a center of the circular region to an edge of the image. In some aspects, the parameters include a scene radius value, where a scene radius is a distance from a center of the circular region to an outside edge of an obstruction captured in the image. In some aspects, the parameters include a rotation of the scene within the circular region, wherein the rotation is with respect to an orientation of the image. In some aspects, the parameters include a flip value, wherein the flip value indicates whether the scene has reversed within the circular region and a direction in which the scene has been reversed.

In some aspects, the parameters include a scaling value, wherein the scaling value indicates whether the scene has been scaled within the circular region, an axis along which the scene has been scaled, and an amount by which the scene has been scaled. In some aspects, the parameters include a field-of-view value, wherein the field-of-view value indicates a number of degrees of view captured in the circular region. In some aspects, the parameters include a compression curve value, wherein the compression curve value indicates a geometric compression curve of the circular region relative to the scene included in the circular region. In some aspects, the parameters include a value indicating a quantity of areas within the image that include unusable pixels. In some aspects, the parameters include a position and size of an area within the image that includes unusable pixels.

In some aspects, generating the encoded video data includes writing the encoded 360-degree video data to a file. In these aspects, the file can be formatted according to an International Standards Organization Base Media File Format (ISOBMFF) format. In some aspects, the parameters are included at a file level, a movie level, or at a track level of the file. In some aspects, the parameters are included in a restricted scheme information box.

In some aspects, the methods, apparatuses, and computer-readable medium described above further comprise encoding the parameters into a Supplemental Enhancement Information (SEI) message. The SEI message can be included in the encoded 360-degree video data. In some aspects, the SEI message is formatted according to an Advanced Video Coding (AVC) or High-Efficiency Video Code (HEVC) standard.

In some aspects, the methods, apparatuses, and computer-readable medium described above further comprise generating the encoded video data includes encoding the parameters as Session Data Protocol (SDP) attributes.

In some aspects, the methods, apparatuses, and computer-readable medium described above further comprise generating the encoded video data includes writing the parameters into a Media Presentation Description (MPD) file.

In some aspects, the methods, apparatuses, and computer-readable medium described above further comprise generating the encoded video data includes writing the parameters into a Motion Pictures Experts Group (MPEG) transport stream.

In some aspects, an apparatus such as described above can include a mobile device. In some implementations, the mobile device includes the omnidirectional camera.

According to at least one example, a method for processing video data is provided. The method includes obtaining encoded video data. The encoded video data includes encoded 360-degree video data captured by an omnidirectional camera and parameters associated with the omnidirectional camera. The method further includes decoding the encoded video data to produce the 360-degree video data. A video frame from the 360-degree video data can include an image of a scene, and wherein, in the image, the scene is warped into a circular region of the image. The method further includes generating a 360-degree video presentation. Generating the 360-degree video presentation can include using the parameters to map the circular region to a format that can be used in a 360-degree video presentation.

In another example, an apparatus is provided that includes a memory a processor configured to obtain encoded video data. The encoded video data includes encoded 360-degree video data captured by an omnidirectional camera and parameters associated with the omnidirectional camera. The processor is configured to and can decode the encoded video data to produce the 360-degree video data. A video frame from the 360-degree video data can include an image of a scene, and wherein, in the image, the scene is warped into a circular region of the image. The processor is configured to and can generate a 360-degree video presentation. Generating the 360-degree video presentation can include using the parameters to map the circular region to a format that can be used in a 360-degree video presentation.

In another example, a computer readable medium is provided having stored thereon instructions that, when executed by a processor, perform a method that includes: obtaining encoded video data. The encoded video data includes encoded 360-degree video data captured by an omnidirectional camera and parameters associated with the omnidirectional camera. The method further includes decoding the encoded video data to produce the 360-degree video data. A video frame from the 360-degree video data can include an image of a scene, and wherein, in the image, the scene is warped into a circular region of the image. The method further includes generating a 360-degree video presentation. Generating the 360-degree video presentation can include using the parameters to map the circular region to a format that can be used in a 360-degree video presentation.

In another example, an apparatus is provided that includes means for obtaining encoded video data. The encoded video data includes encoded 360-degree video data captured by an omnidirectional camera and parameters associated with the omnidirectional camera. The apparatus further includes means for decoding the encoded video data to produce the 360-degree video data. A video frame from the 360-degree video data can include an image of a scene, and wherein, in the image, the scene is warped into a circular region of the image. The apparatus further includes means for generating a 360-degree video presentation. Generating the 360-degree video presentation can include using the parameters to map the circular region to a format that can be used in a 360-degree video presentation.

In some aspects, the methods, apparatuses, and computer-readable medium described above further comprise mapping the circular region into an equirectangular format. These aspects further include using the equirectangular format for the 360-degree video presentation.

In some aspects, the methods, apparatuses, and computer-readable medium described above further comprise mapping the circular region into directly to the 360-degree format. These aspects further include using the 360-degree format for the 360-degree video presentation.

In some aspects, the scene is warped into one or more circular regions of the image. In these aspects, the parameters include a quantity of the one or more circular regions. In some aspects, the parameters include a horizontal coordinate of a center of the circular region. In some aspects, the parameters include a vertical coordinate of a center of the circular region. In some aspects, the parameters include a full radius value, wherein a full radius is a distance from a center of the circular region to an outside edge of the circular region. In some aspects, the parameters include a frame radius value, wherein a frame radius is a distance from a center of the circular region to an edge of the image. In some aspects, the parameters include a scene radius value, where a scene radius is a distance from a center of the circular region to an outside edge of an obstruction captured in the image. In some aspects, the parameters include a rotation of the scene within the circular region, wherein the rotation is with respect to an orientation of the image. In some aspects, the parameters include a flip value, wherein the flip value indicates whether the scene has reversed within the circular region and a direction in which the scene has been reversed.

In some aspects, the parameters include a scaling value, wherein the scaling value indicates whether the scene has been scaled within the circular region, an axis along which the scene has been scaled, and an amount by which the scene has been scaled. In some aspects, the parameters include a field-of-view value, wherein the field-of-view value indicates a number of degrees of view captured in the circular region. In some aspects, the parameters include a compression curve value, wherein the compression curve value indicates a geometric compression curve of the circular region relative to the scene included in the circular region. In some aspects, the parameters include a value indicating a quantity of areas within the image that include unusable pixels. In some aspects, the parameters include a position and size of an area within the image that includes unusable pixels.

In some aspects, the encoded video data is obtained from a file, wherein the file is formatted according to an International Standards Organization Base Media File Format (ISOBMFF) format. In some aspects, the parameters are included at a file level, a movie level, or at a track level. In some aspects, the parameters are included in a restricted scheme information box.

In some aspects, decoding the parameters from a Supplemental Enhancement Information (SEI) message, wherein the SEI message is included in the encoded video data. In some aspects, the SEI message is formatted according to an Advanced Video Coding (AVC) or High-Efficiency Video Code (HEVC) standard.

In some aspects, decoding the encoded video data includes obtaining the parameters from Session Data Protocol (SDP) attributes.

In some aspects, decoding the encoded video data includes obtaining the parameters from a Media Presentation Description (MPD) file.

In some aspects, decoding the encoded video data includes obtaining the parameters from a Motion Pictures Experts Group (MPEG) transport stream.

In some aspects, an apparatus such as described above can include a mobile device. In some implementations, the mobile device includes a display for displaying the 360-degree video presentation.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 18 illustrates an example of a process for encoding 360-degree fisheye video with parameters that describe the fisheye images in the video.

FIG. 19 illustrates an example of a process for decoding encoded video data that includes 360-degree video.

DETAILED DESCRIPTION

Figure 1B:
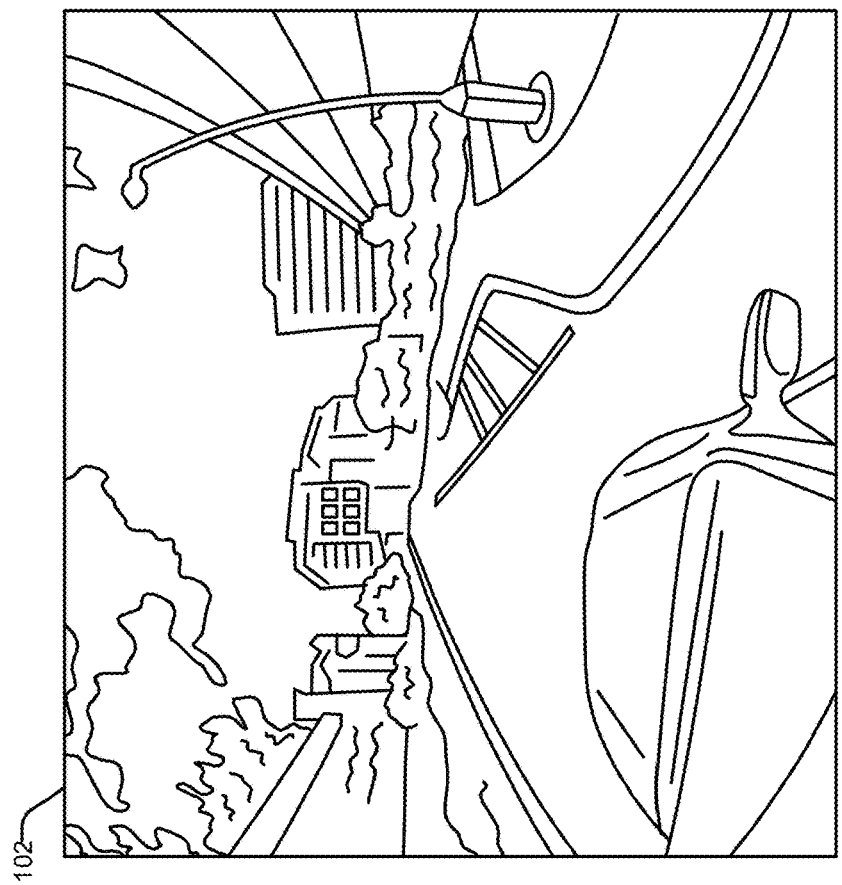
FIG. 1A and FIG. 1B illustrate examples of video frames captured by omnidirectional cameras that use fisheye lenses to capture a wide field of view.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of this disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality describes a three-dimensional environment that can be interacted with in a seemingly real or physical way. In some cases, a user experiencing a virtual reality environment uses electronic equipment, such as a head-mounted display (HMD) and optionally also clothing (e.g., gloves fitted with sensors), to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

360-degree video is video captured for display in a virtual reality environment. In some applications, video from the real world can be used in the presentation of a virtual reality environment, as opposed to computer-generated graphics, such as may be found in gaming and virtual worlds. In these applications, a user can experience another location in the same way that the user can experience her present location. For example, a user can experience a walking tour of Berlin while using a 360-degree video system that is situated in San Francisco.

A 360-degree video system typically includes a video capture device and a video display device, and possibly also other intermediate devices such as servers, data storage, and data transmission equipment. A video capture device may include a camera set, that is, a set of multiple cameras, each oriented in a different direction and capturing a different view. In some applications, six cameras can be used to capture a full 360-degree view centered on the camera set's location. Some video capture devices may use fewer cameras. For example, some video capture devices capture primarily side-to-side views or use lenses with a wide field of view. A video generally includes frames, where a frame is an electronically coded still image of a scene. Cameras capture a certain number of frames per second, which is usually referred to as the camera's frame rate.

In some cases, to provide a seamless 360-degree view, image stitching can be performed on the video captured by each of the cameras in the camera set. Image stitching in the case of 360-degree video generation involves combining or merging video frames from adjacent cameras in the area where the video frames overlap or would otherwise connect. The result would be an approximately spherical frame, and similar to a Mercator projection, the merged data can be represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices can operate on a raster principle—meaning that a video frame is treated as a grid of pixels—in which case square planes, rectangular planes, or other suitably-shaped planes can be used to represent a spherical environment.

360-degree video frames, mapped to a planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

Camera sets for capturing 360-degree video can include various omnidirectional cameras, catadioptric cameras (a camera that uses lenses and curved mirrors), cameras equipped with fisheye lenses, and/or other suitable cameras. One example of an omnidirectional camera is the Ricoh Theta-S, which uses two fisheye lenses that focus in opposite directions.

Figure 1A:
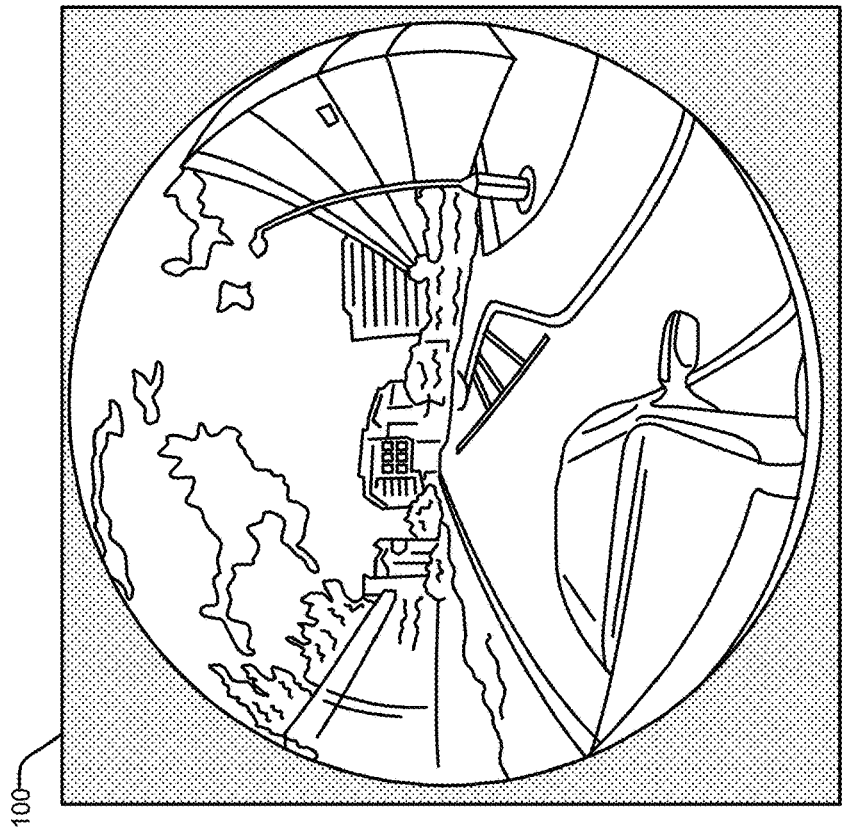

Omnidirectional cameras, such as catadioptric cameras and cameras with fisheye lenses, typically capture images with a significant amount of distortion. FIG. 1A and FIG. 1B illustrate examples of video frames captured by omnidirectional cameras that use fisheye lenses to capture a wide field of view. In the example of FIG. 1A, the video frame 100 includes a circular fisheye image. Fisheye lenses are capable of capturing very wide angles, such as 180 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 1A, the scene captured in the video frame 100 is circular in shape, and is warped from the center to the outside edges of this circular region. Because camera sensors are rectangular, the video frame 100 is rectangular and the image includes areas, here illustrated using stippling, that are not part of the scene. The pixels in these regions are considered not usable, since these pixels are not part of the scene.

The example of FIG. 1B includes a video frame 102 that includes a full-frame fisheye image. In this type of video frame 102, a wide-angle field of view has also been captured in a circular region, with the scene being warped into the circular region. In this example, the image has been scaled (e.g., made larger) so the scene fills the edges of the rectangular frame. This example video frame 102 does not include the unusable areas, and some parts of the scene that can be captured by the lens have been cropped out or not captured.

Figure 2:
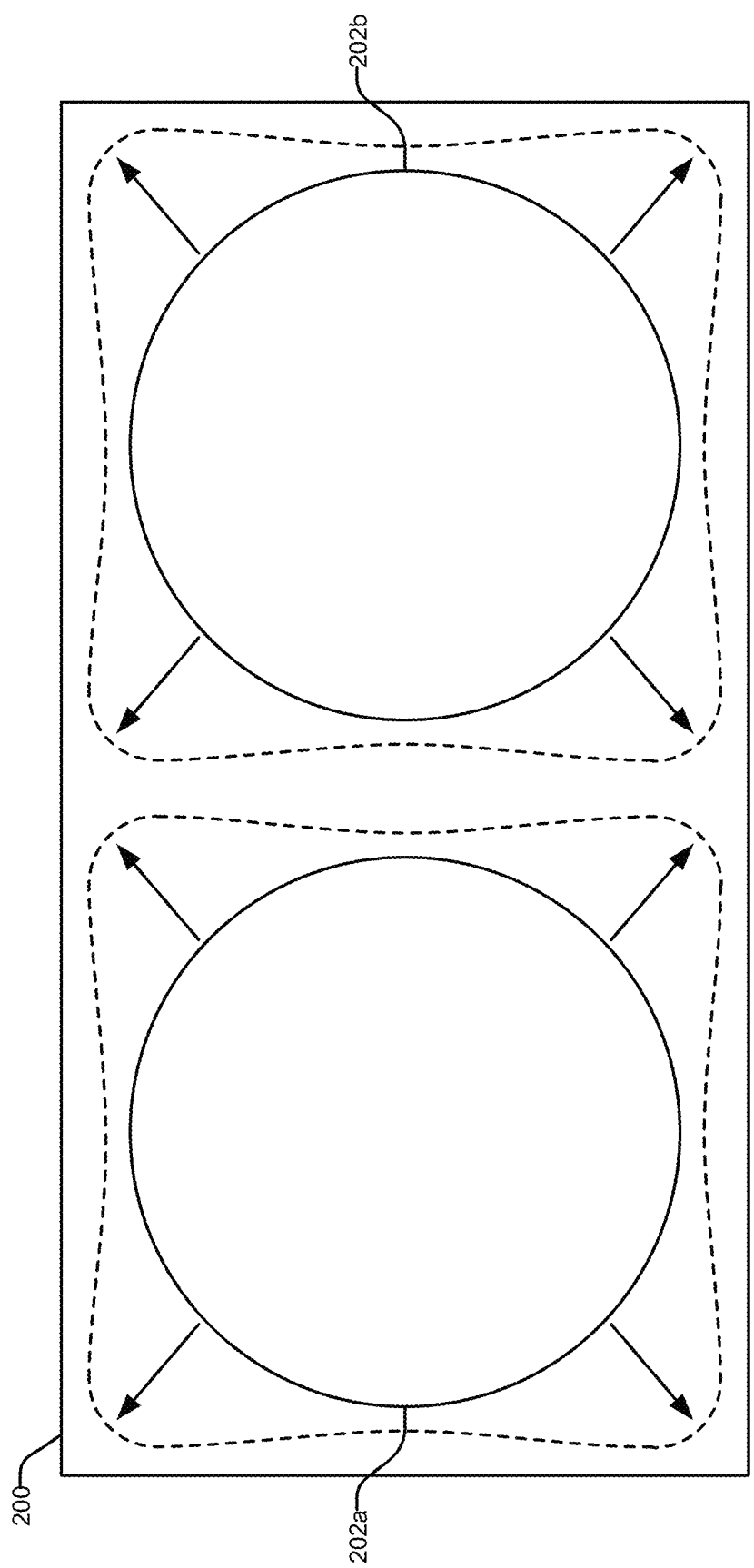
FIG. 2 illustrates an example of an equirectangular video frame.

360-degree video that uses fisheye images to capture a wide field of view can be remapped to other formats. These other formats can be used to store, transmit, and/or view the 360-degree video. One example format is an equirectangular format. FIG. 2 illustrates an example of an equirectangular video frame 200. In this example equirectangular video frame 200, the usable pixels from two fisheye images 202a, 202b (e.g., pixels in the circular regions) have been mapped into an equirectangular format. In this example, each fisheye image 202a, 202b includes a 180-degree or greater field of view, so that, together, the two fisheye images 202a, 202b encompass a 360-degree field of view (possibly with some overlap).

Mapping pixels from the fisheye images 202a, 202b has the effect of unwarping the scene captured in the fisheye images 202a, 202b, and stretching the pixels towards the edges of the video frame 200. The resulting equirectangular image may appear stretched at the top and bottom of the video frame 200. A well-known equirectangular projection is a Mercator projection, in which the geography of the Earth is presented with orthogonal latitude and longitude lines.

In various implementations, the fisheye images 202a, 202b can be mapped to other formats, such as a onto the faces formed by a cube, a cylinder, a pyramid, a truncated pyramid, or some other geometric shape. In each of these cases, distortion present in the fisheye images 202a, 202b can be corrected and unusable pixels can be eliminated. The planar data can also be packaged for storage and/or transmission, and can be used for displaying the 360-degree video.

In some cases, an intermediate format can be useful, for example, for storing and/or transmitting 360-degree video data, or for converting the video data to another format. For example, an equirectangular representation can be mapped to a spherical format (e.g., a spherical geometry) to display the video data, as illustrated in FIG. 3.

Figure 3:
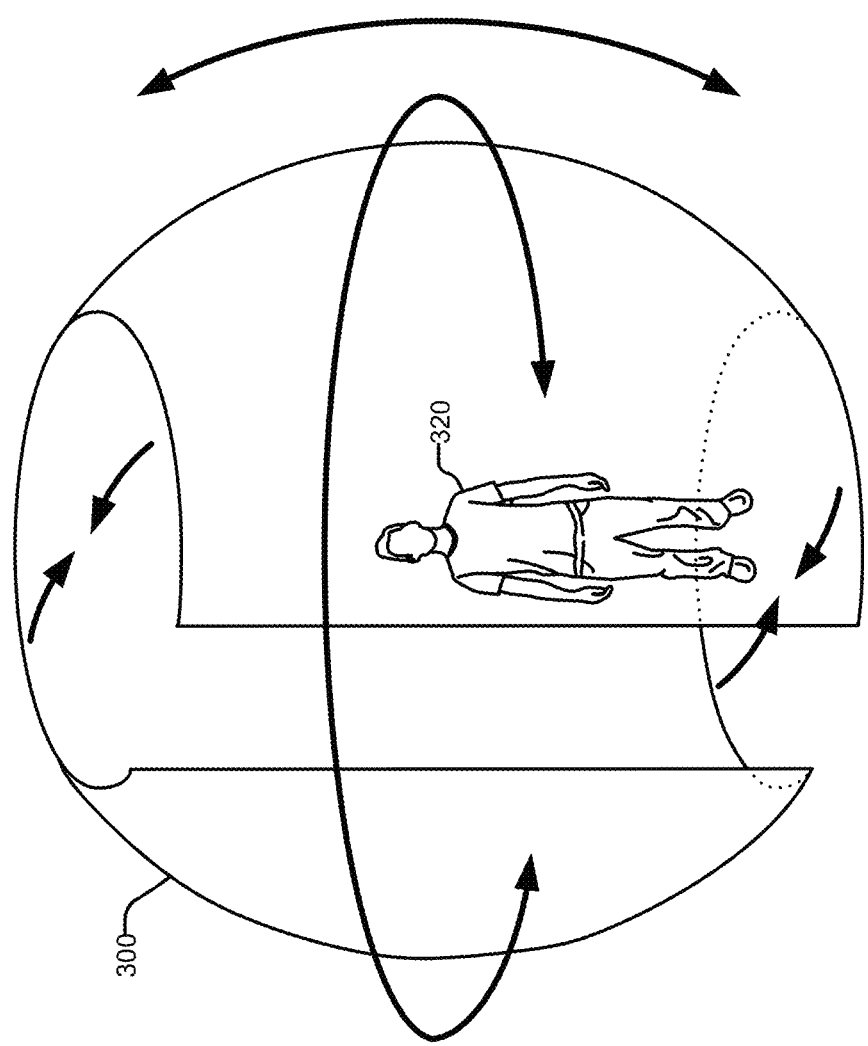
FIG. 3 illustrates an example of an equirectangular video frame being used in a 360 degree video presentation.

FIG. 3 illustrates an example of an equirectangular video frame 300 being used in a 360 degree video presentation. The equirectangular video frame 300 can be mapped onto a spherical geometry, and a resulting spherical representation can be displayed to a viewer 320 using a head-mounted display or some other 360-degree video display device. In other examples, the equirectangular video frame 300 can be mapped to a cubical, cylindrical, pyramidal, or some other geometric shape, where the geometric shape can be used by the 360-degree video display device to display the video.

As noted above, an equirectangular video frame 300 can capture a full 360-degree field of view, with the pixels in the upper and lower regions appearing stretched and/or compressed. To use the equirectangular video frame 300 in a 360-degree video presentation, the pixels in the equirectangular video frame 300 can be mapped to a spherical representation. This mapping can have the effect of expanding the upper and lower regions of the equirectangular video frame 300 towards the top and bottom (e.g., the "north pole" and "south pole", respectively) of the spherical representation. Expanding the upper and lower regions can correct distortion in these areas that is apparent in the equirectangular video frame 300.

Mapping the equirectangular video frame 300 to a spherical representation can further have the effect of wrapping the width of the frame around the center (e.g., the equator) of the spherical representation. The left and right edges of the equirectangular video frame 300 can be mapped next to each other, so that no "seam" appears.

Once the equirectangular video frame 300 has been mapped to a spherical representation, the spherical representation can be displayed. A viewer 320, using a head-mounted display or another 360-degree video display device, can view the spherical representation from within the spherical representation. In most cases, the viewer 320 is positioned such that the "ground," from the viewer's perspective, is the bottom-most point of the spherical representation. In some cases, the equator of the spherical representation is positioned at the viewer's eye level. In various implementations, the spherical representation can be expanded or contracted to suit the viewer's height and/or position (e.g., if the viewer is sitting, standing, or in some other position).

Figure 4B:
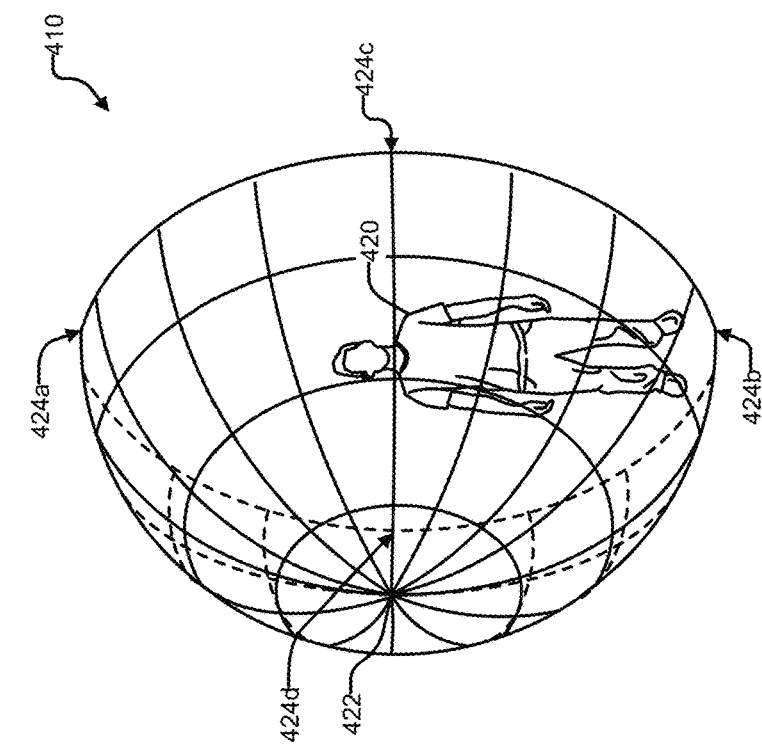
FIG. 4A and FIG. 4B illustrate an example where a fisheye image in a 360-degree video frame has been mapped directly to a hemispherical representation.
Figure 4A:
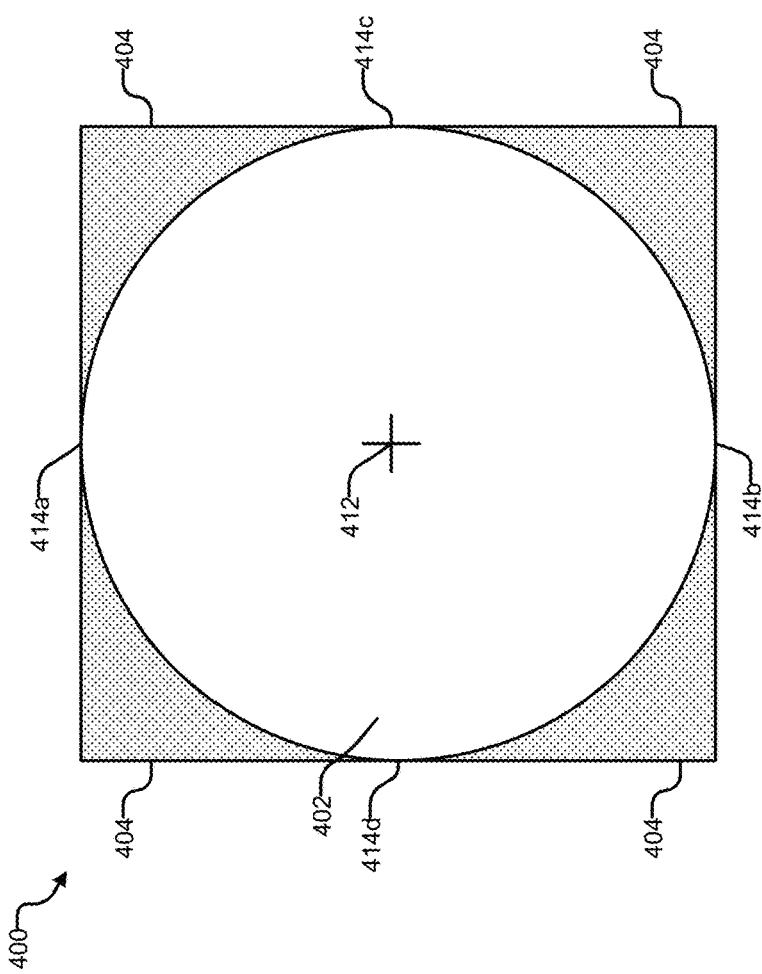

In some cases, however, an intermediate format, such as an equirectangular format, is not necessary. In various implementations, instead of first mapping to equirectangular shape, fisheye images in 360-degree video can be mapped directly to a representation that can be displayed. FIG. 4A and FIG. 4B illustrate an example where a fisheye image in a 360-degree video frame 400 has been mapped directly to a hemispherical representation 410. As discussed above, the video frame 400 of FIG. 4A is rectangular in shape, where the rectangular shape corresponds to the size and shape of the camera's image capture sensor. The video frame 400 includes a circular region 402 that includes pixels that capture a scene. The corners 404 of the video frame 400, where no pixels were captured, can be left blank or can include black pixels (e.g., with a pixel value of 0 or 255).

The pixels captured in the circular region 402 include a certain field of view, where the field of view is dictated by the lens and/or camera. For example, the circular region 402 can include a 90-degree field of view, a 180-degree field of view, a 270-degree field of view, or a field of view of some other degree, depending on the construction of the camera's lens, mirror(s), and/or sensor. The field of view can alternatively or additionally be expressed in radians. To fit the field of view into the video frame 400, the pixels are warped into the circular region 402 in a linear or non-linear manner.

In various implementations, the techniques described below map the pixels in the circular region 402 to a hemispherical representation 410, an example of which is illustrated in FIG. 4B. The hemispherical representation 410 can then be used to present the video frame 400 to a viewer 420 using a 360-degree video display device. The hemispherical representation 410 can be half of a sphere (which represents 180 degrees of view), less than half of a sphere (e.g., when the video frame 400 captures less than 180 degrees of view), or greater than half of a sphere (e.g., when the video frame 400 captures more than 180 degrees of view).

In various implementations, mapping the circular region 402 of the video frame 400 to the hemispherical representation 410 can have the effect of stretching the pixels in the circular region 402 into a hemispherical shape. For example, the center 412 of the circular region 402 can correspond to the center 422 or apex of the hemispherical representation 410. As a further example, the top-most point 414a of the circular region 402 can correspond to the top-most point 424a (e.g. polar north) of the hemispherical representation 410, and the bottom-most point 414b of the circular region 402 can correspond to the bottom-most point 424b (e.g. polar south) of the hemispherical representation 410. Similarly, the far right 414c and far left 414d of the circular region 402 can correspond to what in this example are the far right 424c of the hemispherical representation 410 and the not-visible far-left 424d. The pixels in between the center 412 and edges of the circular region 402 can further be evenly distributed over the surface of the hemispherical representation 410.

The resulting hemispherical representation 410 can be used to present the flat video frame 400 in a 360-degree video presentation. Using a 360-degree video display device, the hemispherical representation 410 can be rendered such that a viewer 420 is given the impression that he is inside of the scene represented by the pixels captured by the hemispherical representation 410. In some cases, the apex of the hemispherical representation 410 can be oriented to be in the center of the viewer's field of view.

In various implementations, an additional hemispherical representation can be provided for the view that would be behind the viewer 420. For example, as noted above, a camera can be equipped with two fisheye lenses that are positioned back-to-back. The camera can capture two images that together provide 360 degrees of view (or more) of a scene. In such an example, the camera can capture a second fisheye image (not shown), which can be included in the same frame 400 as the fisheye image shown in FIG. 4 or can be included in a different frame. The second fisheye image can be mapped directly to another hemispherical representation (not shown) that is directly behind the viewer 420. The two half-spheres make up a full sphere, which can be rendered for display to provide a full 360-degree view of the scene captured by the video frame(s).

By mapping directly from the fisheye images to a display format, and bypassing an intermediate format, the amount of processing required to display the 360-degree video, and time required to execute the processing can be reduced. Reducing processing requirements also has the added benefit of reducing battery usage in portable devices. Additionally, time savings in avoiding the intermediate format can be beneficial in live-streaming applications, such as 360-degree live broadcast of sporting events. Other possible benefits from mapping directly from fisheye images to a display format are improvement in image quality and/or reduced bandwidth requirements. For example, stretching and/or extrapolation of pixels that may occur in generating an intermediate format can be avoided. In this example, data generated in the extrapolating pixel data is also avoided. Instead, the optical compression of the fisheye lens is preserved.

Directly mapping from captured video to a display format can possibly be executed more efficiently when the captured video uses fisheye lenses. For example, camera sets that use four or six lenses may capture large, overlapping areas between adjacent lenses. This redundant data is removed in an intermediate format, but without the intermediate mapping, the size of the 360-degree video data may be quite large. In contrast, a camera set that uses fisheye lenses can produce images with less or very little overlap. The video data may thus be more compact.

To map fisheye images in a 360-degree video directly to a display format, or to map to an intermediate format, a computing device executing the mapping requires information about the fisheye images. Such information can include, for example, the field of view captured in each fisheye image, the size and orientation of the fisheye images within the video frames, and other parameters, such as are discussed further below. Presently, information that describes fisheye images in 360-degree video is not provided by omnidirectional cameras or is provided in a non-standard fashion. Additionally, each camera may capture and record images differently, such that the position of usable pixels in 360-degree fisheye video cannot be easily assumed.

Without parameters that describe the fisheye images in a 360-degree video, a software application cannot easily convert the fisheye data into an intermediate format. The software application could attempt to distinguish between usable and unusable pixels in a video, but determining information such as the field of view and the degree of radial distortion in the image may be very difficult and prone to inaccuracy. Software that does not have parameters that describe the fisheye images may thus produce remapped video frames that have low visual quality.

Video conversion requirements introduce additional issues. For example, services that host video content, such as websites, sometimes require that 360-degree video uploaded to the services' servers be formatted according to a certain intermediate format (e.g., an equirectangular format, or other suitable format specified by the services). Video hosting services may not provide conversion from captured video to the required intermediate format, in which case the individual who is uploading the video may be responsible for executing the conversion.

360-degree video cameras may come with suitable software for converting the video produced by the camera to other formats, but this software can be difficult to use. The camera user may not have the technical knowledge needed to understand the software and any possible settings (e.g., view modes, unfold modes, control area, calibration, etc.). In fact, the camera user may want simple software (e.g., push-button, or other simple software) that does not require in-depth technical knowledge. Additionally, the software may rely on proprietary, non-standard data that describes the format of the captured video. The software may thus only be able to process video data from one type of camera, and not from cameras having other types.

In various implementations, various parameters that describe fisheye 360-degree video content can be defined. These parameters can be used to map fisheye images in 360-degree video to an intermediate format, or to map fisheye images in 360-degree video directly to a display format.

In various implementations, fisheye 360-degree video data can be encoded directly from the camera, without any intermediate processing. In various implementations, a video capture device can encode parameters, which describe fisheye images in the video data, with the video data. A video display device, or some other device that decodes the encoded data, can use the parameters to map the 360-degree fisheye video to an intermediate format or a display format.

In some implementations, the fisheye video parameters can be encoded into a file that stores the 360-degree video data. For example, the file can be formatted using an ISO Base Media File Format (ISOBMFF) standard. In this example, the parameters can be included in one or more data structures (referred to as "boxes" by the ISOBMFF) in the file. As another example, the parameters can be included in a Supplemental Enhancement Information (SEI) message, and be included in an encoded bitstream that includes the video data. As another example, the parameters can be included as an attribute or element in a Media Presentation Description (MPD) file, which is used for streaming video according to the DASH standard. As another example, the parameters can be included as Session Description Protocol (SDP) attributes. As another example, the parameters can be included as descriptors in a MPEG-2 transport stream. These and other examples can be used independently or in various combinations.

Fisheye video parameters provided using one or more of the above examples can be used for various applications. For example, user-generated 360-degree video can be uploaded to a server, and other devices can consume the video using DASH or some other adaptive streaming technology. In this example, the 360-degree video data can be transcoded or transformed from a fisheye format to a commonly used format, such as an equirectangular or cube map format. In some cases, a server hosting the video content can use the fisheye video parameters to execute the remapping. In some cases, the video can be provided to a client device with the fisheye video parameters, and the client device can execute the remapping. In this example, the parameters can, for example, be encoded in an ISOBMFF file, in an SEI message in an encoded bitstream, in a DASH MPD, in a session description, in an MPEG-2 transport stream, or in some other suitable format.

Another example application is a See-What-I-See (SWIS) type of video chat or similar application. In this type of application, two users can speak using live video, and one user can show her environment, using 360-degree video, to the other user, in real-time. In this example, the fisheye video can be transmitted from the first user's device to the second user's device along with the fisheye parameters. The second user's device can then render the fisheye video for display to the second user. In this example, the RTP/UDP/IP protocol stack can be used for the video transmission, because, similar to video telephony and video conferencing, the conversational nature of the transmission requires low end-to-end latency. The HTTP/TCP/IP protocol stack, which would be used for streaming video, may not have low enough latency. In this example, the fisheye parameters can, for example, be encoded in a session description, among other examples.

Figure 5:
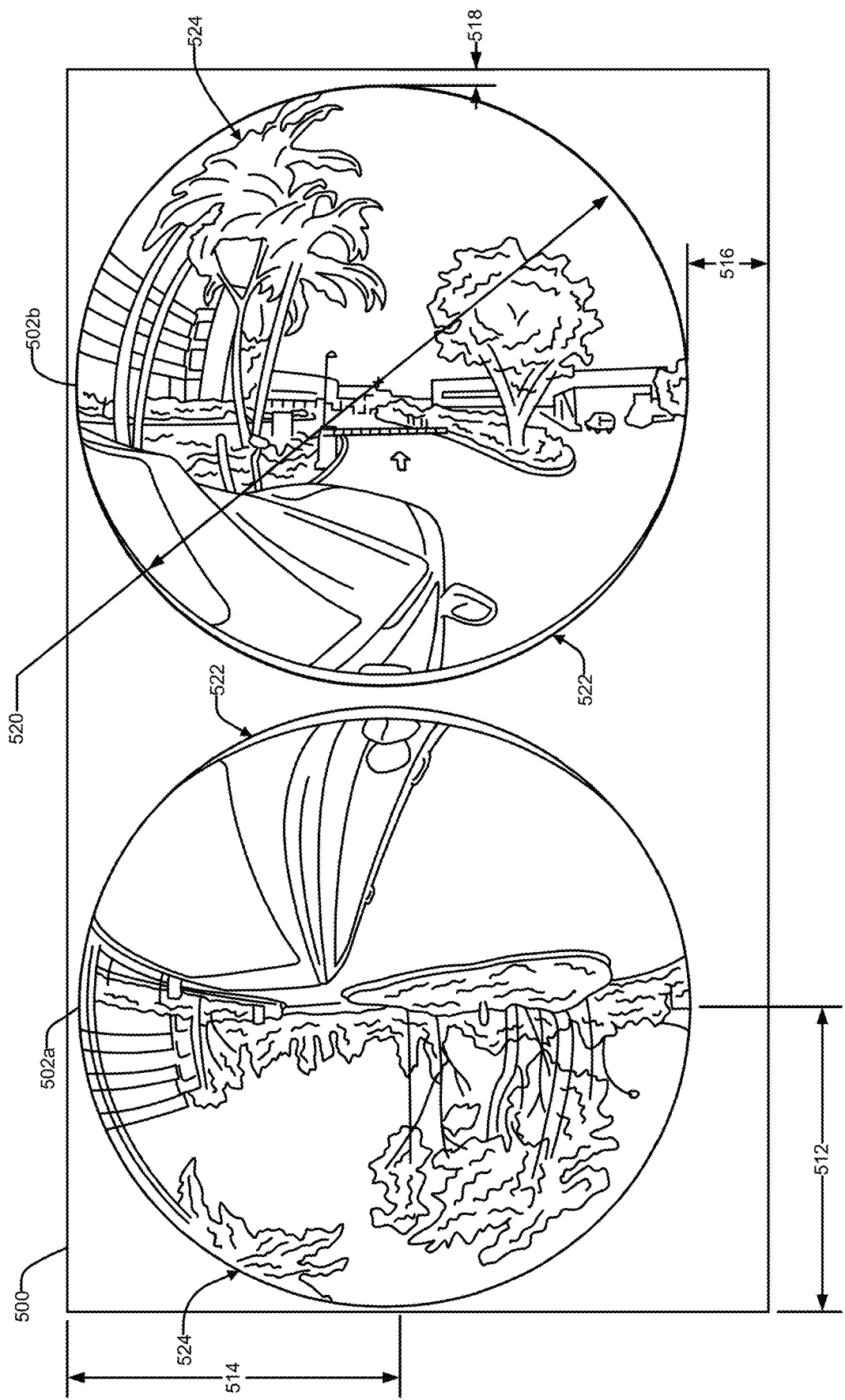
FIG. 5 illustrates an example of a video frame captured by an omnidirectional camera that has two fisheye lenses.

FIG. 5 illustrates examples of various fisheye parameters, here illustrated using a video frame 500 captured by an omnidirectional camera that has two fisheye lenses. In this example, the lenses are mounted facing in opposite directions, and the camera is able to simultaneously record images from both lenses into one video frame 500. As a result, the example video frame 500 includes two circular regions 502a, 502b. The left-hand circular region 502a contains a warped view of a scene, while the right-hand circular region 502b includes the same scene but facing 180 degrees from the scene in the left-hand circular region 502a. In other examples, a video frame from an omnidirectional camera may have one fisheye image, or may have more than two fisheye images.

In the example of FIG. 5, various parameters can describe the fisheye images captured in the video frame 500. For example, a parameter can provide that the video frame 500 includes two fisheye images (or one or four or however many fisheye images are captured in the video frame 500). As another example, parameters can describe the orientation of each fisheye image. In the illustrated example, both fisheye images are on their sides, with the ground positioned on the left in the right-hand image, and positioned on the left in the left-hand image.

In various implementations, parameters can describe the location and geometry of the fisheye images. For example, a parameter can provide a horizontal coordinate 512 of the center of one or the other or both circular regions 502a, 502b. The horizontal coordinate 512 can be provided with respect to the left or the right edge of the video frame 500. As another example, a parameter can provide a vertical coordinate 514 of the center of one or the other or both circular regions 502a, 502b. The vertical coordinate 514 can be provided relative to the top or the bottom edge of the video frame 500. The horizontal 512 and vertical 514 coordinates can be expressed in millimeters or pixels or some other unit of measure. As another example, the parameters can include the diameter 520 or radius of the circular regions 502a, 502b.

In various implementations, parameters can also describe the unused areas of the video frame 500, that is, the areas outside of the circular regions 502a, 502b. For example, a vertical distance 516 can describe the distance between the bottom edge (and/or the top edge) of the video frame 500 and the circular regions 502a, 502b. As another example, a horizontal distance 518 can describe the distance between the right edge (and/or left edge) of the video frame 500 and the circular regions 502a, 502b. The vertical 516 and horizontal 518 distances can be expressed in millimeters or pixels or some other unit of measure.

In various implementations, the parameters can also include information about the lenses that captured the images. For example, the parameters can include a field of view. The field of view is the portion of the real world that can be captured by the lens. The field of view can be expressed in degrees. For example, a fisheye lens can have a field of view of 180 degrees or greater (or less). In the illustrated example, the field of view is greater than 180 degrees, as indicated by an element 524 that appears in both the left-hand 502a and right hand 502b circular regions. As another example, the parameters can include whether the fisheye distortion is linear from the center of the lens to the outside edge, or is non-linear. If the distortion is non-linear, the parameters can include scaling values that adjust for the non-linearity.

In various implementations, the parameters can also describe camera and/or lens artifacts. For example, in the illustrated example, the camera body 522 is visible in both of the circular regions 502a, 502b. In other examples, parts of the camera body and/or lens body may be visible in other parts of the circular regions 502a, 502b. In some examples, the camera body and/or lens body may be visible all around the circular regions 502a, 502b.

Various other parameters can describe situations not illustrated here. For example, parameters can describe whether one or the other fisheye image is mirrored with respect to the other fisheye image or with respect to the real world. For example, the right-hand fisheye image may be flipped in the up-and-down direction, the left-to-right direction, or in some other direction. Parameters that describe any mirroring can be used to determine a correspondence between the edges of the left-hand circular region 502a and the right-hand circular region 502b.

Various other parameters can also be provided that may be useful in rendering the video frame 500. For example, the parameters can include camera calibration parameters, such as degrees of rotation (e.g., pitch, yaw, and/or roll) and the camera's location in the real world.

Some or all of the parameters discussed above can be provided by the camera that captured the video frame 500. For example, the camera may have information that describes the lenses used to captured the fisheye images, including, for example, the field of view of the lenses and/or and the manner in which the lenses warp the image. As another example, the camera may have information that describes the manner in which the fisheye images are written into the video frame 500.

In some cases, the same type of lens, having the same field of view, focal length, shape, and/or other characteristic, would have been used to capture both the left-hand and right-hand fisheye image, though this may not always be the case. When the two fisheye images are different, separate parameters may be provided for each.

Figure 6A:
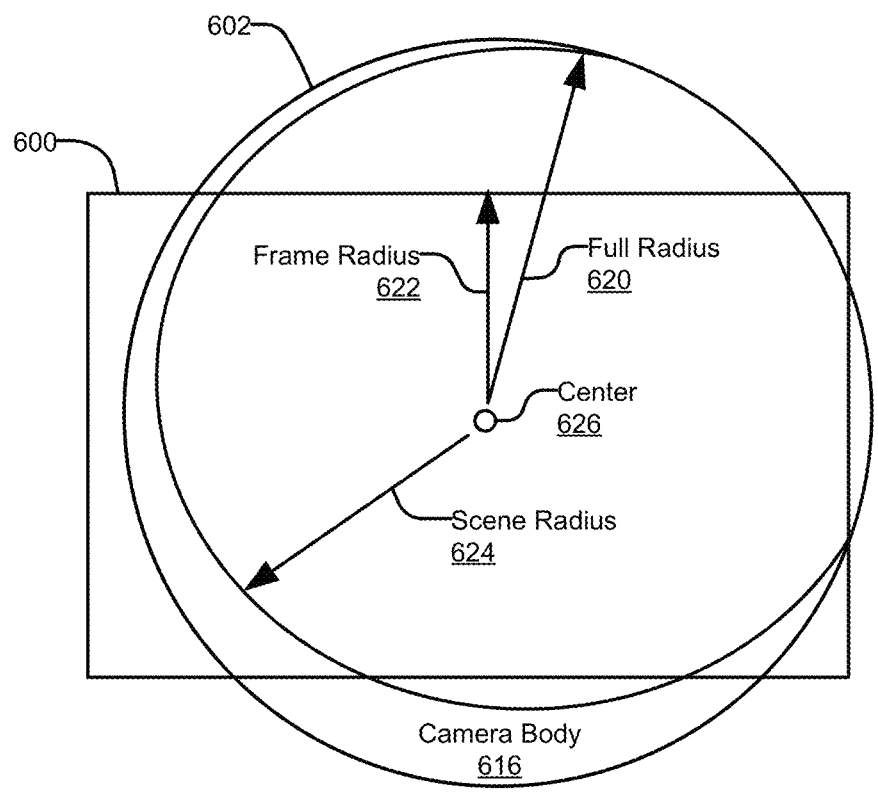
FIG. 6A illustrates an example of additional parameters that can be used to describe a fisheye image captured in a video frame.

FIG. 6A illustrates an example of additional parameters that can be used to describe a fisheye image captured in a video frame 600. In this example, the circular region 602 that can be captured by a fisheye lens is not fully contained within the video frame 600. This may occur when, for example, a camera is configured to capture full-frame fisheye video, because the field of view is wider than the image sensor, or for some other reason.

In this and other examples, the parameters that describe the fisheye image can include a full radius 620, and a scene radius 624. The full radius 620 describes the distance from the center 626 of the circular region 602 to the outside edge of the circular region 602. Stated differently, the full radius 620 describes a region that can be captured by the lens. The frame radius 622 describes the distance from the center 626 of the circular region 602 to the nearest edge of the video frame 600. The frame radius 622 thus describes a region that is actually captured in the video frame 600. In some implementations, a frame radius value can be provided for all four edges of the video frame 600. The scene radius 624 describes a distance from the center 626 of the circular region 602 to the edge of an obstruction, which in this example is the camera body 616. In some cases, the field of view of a fisheye lens is great enough to capture part of the camera itself in to the image. Alternatively or additionally, the camera body 616 may appear in the image due to the orientation of the lens with respect to the camera body. In various implementations, the scene radius 624 value can accommodate for the camera body 616, or some other consistent obstruction, that appears in the video frame 600. The scene radius 624 can be used to ignore this obstruction when the fisheye image is mapped to another format.

Figure 6B:
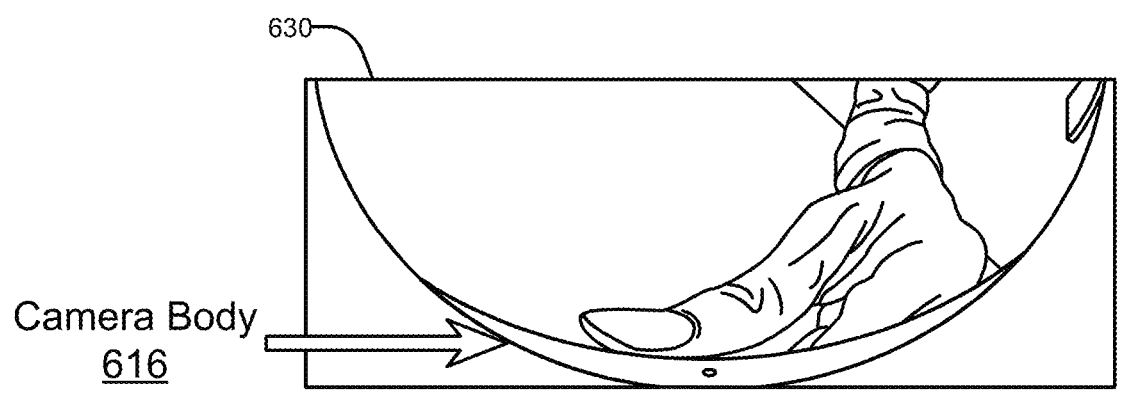
FIG. 6B illustrates an example of a lower part of a fisheye image, to illustrate the presence of the camera body in the image.

FIG. 6B illustrates an example of a lower part of a fisheye image 630, to illustrate the presence of the camera body 616 in the image 630. In this example, the hand that is photographed should appear at the lowest most edge of the fisheye image, but instead the camera body 616 obstructs this area of the image.

In various implementations, 360-degree fisheye video can be directly packed into a file, without any intermediate processing to remap the fisheye images to another format. In these implementations, parameters that describe the fisheye images can be included in the file.

File format standards can define the format for packing and unpacking video (and possibly also audio) data into one or more files. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244) and Advanced Video Coding (AVC) file format and High Efficiency Video Coding (HEVC) file format (both defined in ISO/IEC 14496-15). The draft texts of recent new editions for ISO/IEC 14496-12 and 14496-15 are available at http://phenix.int-evry.fr/mpeg/doc_end_user/documents/111_Geneva/wg11/w15177-v6-w15177.zip and http://phenix.int-evry.fr/mpeg/doc_end_user/documents/112_Warsaw/wg11/w15479-v2-w15479.zip, respectively.

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GPP), the Digital Video Broadcasting (DVB) file format, or any other suitable multimedia container format). ISOBMFF-based file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

The ISOBMFF and its derived file formats (e.g., the AVC file format or other derived file formats) are widely used for storage and encapsulation of media content (e.g., including video, audio, and timed text) in many multimedia applications. The ISOBMFF and file formats derived from ISOBMFF do not, however, include specifications for storing virtual reality (VR) content. For example, if a 360-degree video is stored in a file based on ISOBMFF or a derived file format, a player device may treat (e.g., may attempt to process) the 360-degree video as a conventional planar video (e.g., the player device may treat the 360-degree video as not including 360-degree content). The player may thus not apply the necessary projection of the 360-degree video during rendering, resulting in the video being distorted and potentially unviewable when displayed.

In various implementations, modifications and/or additions to the ISOBMFF can indicate that a file that has been formatted according to the ISOBMFF, or a format derived from the ISOBMFF, includes virtual reality content. For example, in some implementations, a file can include a file-level indication, which signals (e.g., indicates) that the contents of the file are formatted for use in virtual reality use cases or implementations. As another example, in some implementations, a file can include a movie-level indication, which signals (e.g., indicates) that the movie presentation in the file includes virtual reality content. As another example, in some implementations, a file can include a track-level indication, which signals (e.g., indicates) that a track includes virtual reality content. In various implementations, parameter related to the virtual reality content can also be signaled at the file, movie, and/or track level.

In these and other implementations, player devices can recognize when a file includes virtual reality content. In some cases, player devices that are not capable of displaying virtual reality content can ignore and/or skip the virtual reality media.

Figure 7:
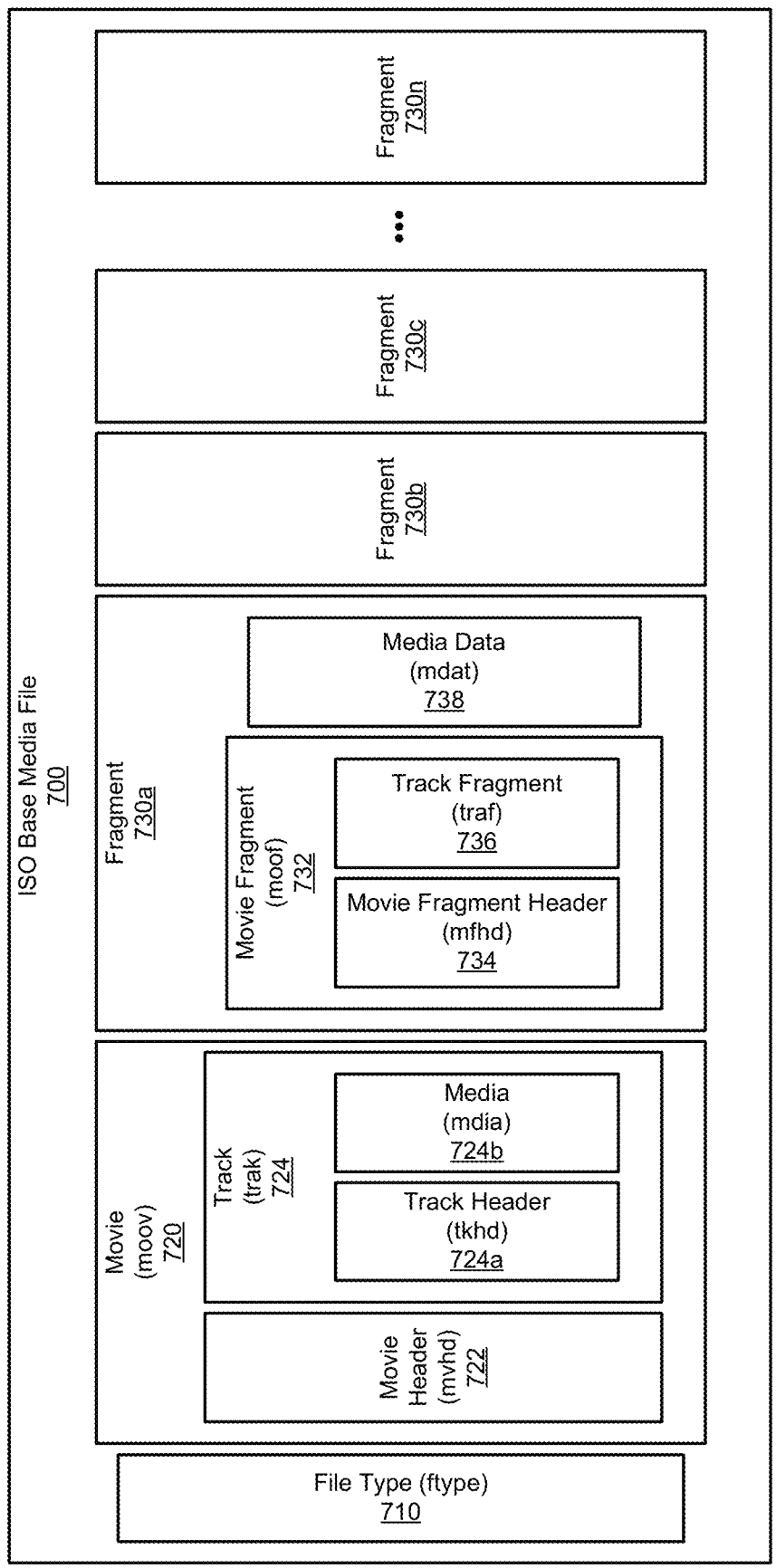
FIG. 7 illustrates an example of an ISO base media file that contains data and metadata for a video presentation, formatted according to the ISOBMFF.

FIG. 7 illustrates an example of an ISO base media file 700 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 7, at the top level of the file, an ISO base media file 700 can include a file type box 710, a movie box 720, and one or more movie fragments 730a, 730n. Other boxes that can be included at this level but that are not represented in this example include free space boxes, metadata boxes, and media data boxes, among others.

An ISO base media file can include a file type box 710, identified by the box type "ftyp." The file type box 710 identifies an ISOBMFF specification that is the most suitable for parsing the file. "Most" in this instance means that the ISO base media file 700 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 710 can also include a version number, which can be used to indicate a version of the ISOBMFF specification. The file type box 710 can also include a list of compatible brands, which includes a list of others brands with which the file is compatible. An ISO base media file can be compatible with more than one major brand.

When an ISO base media file 700 includes a file type box 710, there is only one file type box. An ISO base media file 700 may omit the file type box 710 in order to be compatible with older player devices. When an ISO base media file 700 does not include a file type box 710, a player device can assume a default major brand (e.g. "mp41"), minor version (e.g., "0"), and compatible brand (e.g., "mp41"). The file type box 710 is typically placed as early as possible in the ISO base media file 700.

An ISO base media file can further include a movie box 720, which contains the metadata for the presentation. The movie box 720 is identified by the box type "moov." ISO/IEC 14496-12 provides that a presentation, whether contained in one file or multiple files, can include only one movie box 720. Frequently, the movie box 720 is near the beginning of an ISO base media file. The movie box 720 includes a movie header box 722, and can include one or more track boxes 724 as well as other boxes.

The movie header box 722, identified by the box type "mvhd," can include information that is media-independent and relevant to the presentation as a whole. For example, the movie header box 722 can include information such as a creation time, a modification time, a timescale, and/or a duration for the presentation, among other things. The movie header box 722 can also include an identifier that identifies the next track in the presentation. For example, the identifier can point to the track box 724 contained by the movie box 720 in the illustrated example.

The track box 724, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 724 includes a track header box 724a and a media box 724b. A track box can include other boxes, such as a track reference box, a track group box, an edit box, a user data box, a meta box, and others.

The track header box 724a, identified by the box type "tkhd," can specify the characteristics of a track contained in the track box 724. For example, the track header box 724a can include a creation time, modification time, duration, track identifier, layer identifier, group identifier, volume, width, and/or height of the track, among other things. For a media track, the track header box 724a can further identify whether the track is enabled, whether the track should be played as part of the presentation, or whether the track can be used to preview the presentation, among other things. Presentation of a track is generally assumed to be at the beginning of a presentation. The track box 724 can include an edit list box, not illustrated here, that can include an explicit timeline map. The timeline map can specify, among other things, an offset time for the track, where the offset indicates a start time, after the beginning of the presentation, for the track.

In the illustrated example, the track box 724 also includes a media box 724b, identified by the box type "mdia." The media box 724b can contain the objects and information about the media data in the track. For example, the media box 724b can contain a handler reference box, which can identify the media type of the track and the process by which the media in the track is presented. As another example, the media box 724b can contain a media information box, which can specify the characteristics of the media in the track. The media information box can further include a table of samples, where each sample describes a chunk of media data (e.g., video or audio data) including, for example, the location of the data for the sample. The data for a sample is stored in a media data box, discussed further below. As with most other boxes, the media box 724b can also include a media header box.

In the illustrated example, the example ISO base media file 700 also includes multiple fragments 730a, 730b, 730c, 730n of the presentation. The fragments 730a, 730b, 730c, 730n are not ISOBMFF boxes, but rather describe a movie fragment box 732 and the media data box 738 that is referenced by the movie fragment box 732. The movie fragment box 732 and media data boxes 738 are top-level boxes, but are grouped here to indicate the relationship between a movie fragment box 732 and a media data box 738.

A movie fragment box 732, identified by the box type "moof," can extend a presentation by including additional information that would otherwise be stored in the movie box 720. Using movie fragment boxes 732, a presentation can be built incrementally. A movie fragment box 732 can include a movie fragment header box 734 and a track fragment box 736, as well as other boxes not illustrated here.

The movie fragment header box 734, identified by the box type "mfhd," can include a sequence number. A player device can use the sequence number to verify that the fragment 730a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 732 can also include one or more track fragment boxes 736, identified by the box type "traf." A movie fragment box 732 can include a set of track fragments, zero or more per track. The track fragments can contain zero or more track runs, each of which describes a contiguous run of samples for a track. Track fragments can be used to add empty time to a track, in addition to adding samples to the track.

The media data box 738, identified by the box type "mdat," contains media data. In video tracks, the media data box 738 would contain video frames. A media data box can alternatively or additionally include audio data. A presentation can include zero or more media data boxes, contained in one or more individual files. The media data is described by metadata. In the illustrated example, the media data in the media data box 738 can be described by metadata included in the track fragment box 736. In other examples, the media data in a media data box can be described by metadata in the movie box 720. The metadata can refer to a particular media data by an absolute offset within the file 700, such that a media data header and/or free space within the media data box 738 can be skipped.

Other fragments 730b, 730c, 730n in the ISO base media file 700 can contain boxes similar to those illustrated for the first fragment 730a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF specification specifies six types of Stream Access Points (SAPs) for use with DASH. The first two SAP types (types 1 and 2) correspond to instantaneous decoding refresh (IDR) pictures in H.264/AVC and HEVC. For example, an IDR picture is an intra-picture (I-picture) that completely refreshes or reinitializes the decoding process at the decoder and starts a new coded video sequence. In some examples, an IDR picture and any picture following the IDR picture in decoding order cannot be dependent on any picture that comes before the IDR picture in decoding order.

The third SAP type (type 3) corresponds to open-GOP (Group of Pictures) random access points, hence broken link access (BLA) or clean random access (CRA) pictures in HEVC. For example, a CRA picture is also an I-picture. A CRA picture may not refresh the decoder and may not begin a new CVS, allowing leading pictures of the CRA picture to depend on pictures that come before the CRA picture in decoding order. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In some embodiments, in the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

The fourth SAP type (type 4) corresponds to gradual decoding refresh (GDR) random access points.

The ISOBMFF, while flexible and extensible and widely used to store and transmit various types of media, does not include mechanisms for storing virtual reality video or identifying the contents of an ISO base media file as including virtual reality content. Player devices may thus not be able to determine that the contents of a file include virtual reality or 360-degree video. Player devices that are not capable of displaying virtual reality content may attempt to display the content anyway, resulting in a distorted presentation.

In various implementations, the ISOBMFF and/or file formats derived from the ISOBMFF can be modified and/or extended so that virtual reality content can be identified. These implementations can involve boxes, brand values, reserved bits in a box, and/or other indicators that can each independently or in combination identify virtual reality content.

In various implementations, parameters that describe fisheye images in a 360-degree video can be included in an ISOBMFF file. For example, the parameters can be included at the file level, the movie level, and/or the track level. In some implementations, the parameters can be included in an ISOBMFF file in a backwards-compatible manner. "Backwards-compatible" in this context means that a video display device that does not support 360-degree video, or that does not support rendering fisheye images into a display format, can still parse and play some version in video, instead of attempting the present the 360-degree video and providing a distorted result.

Figure 8A:
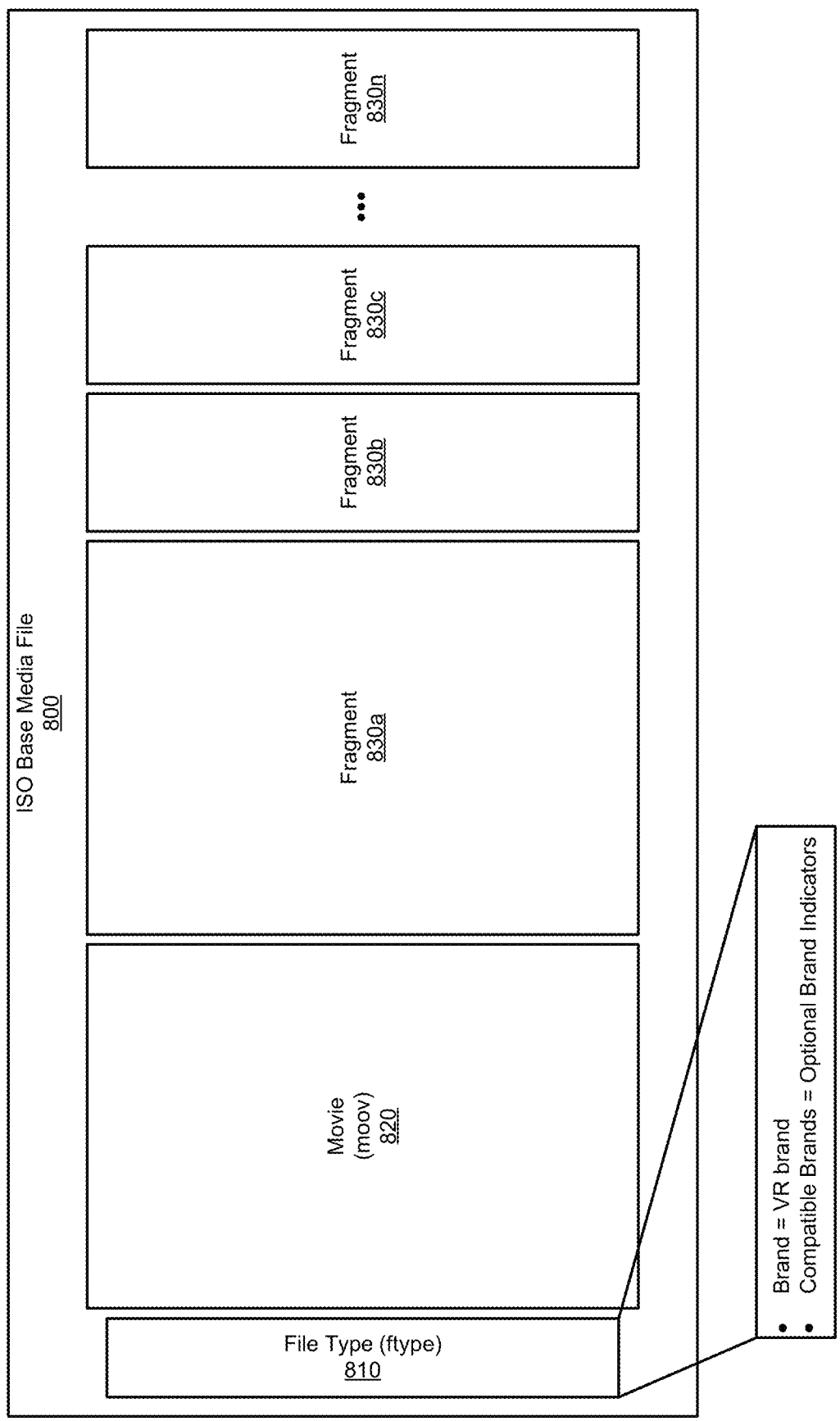
FIG. 8A and FIG. 8B illustrate examples where a top-level box in an ISO base media file is used to indicate that the file includes virtual reality content.
Figure 8B:
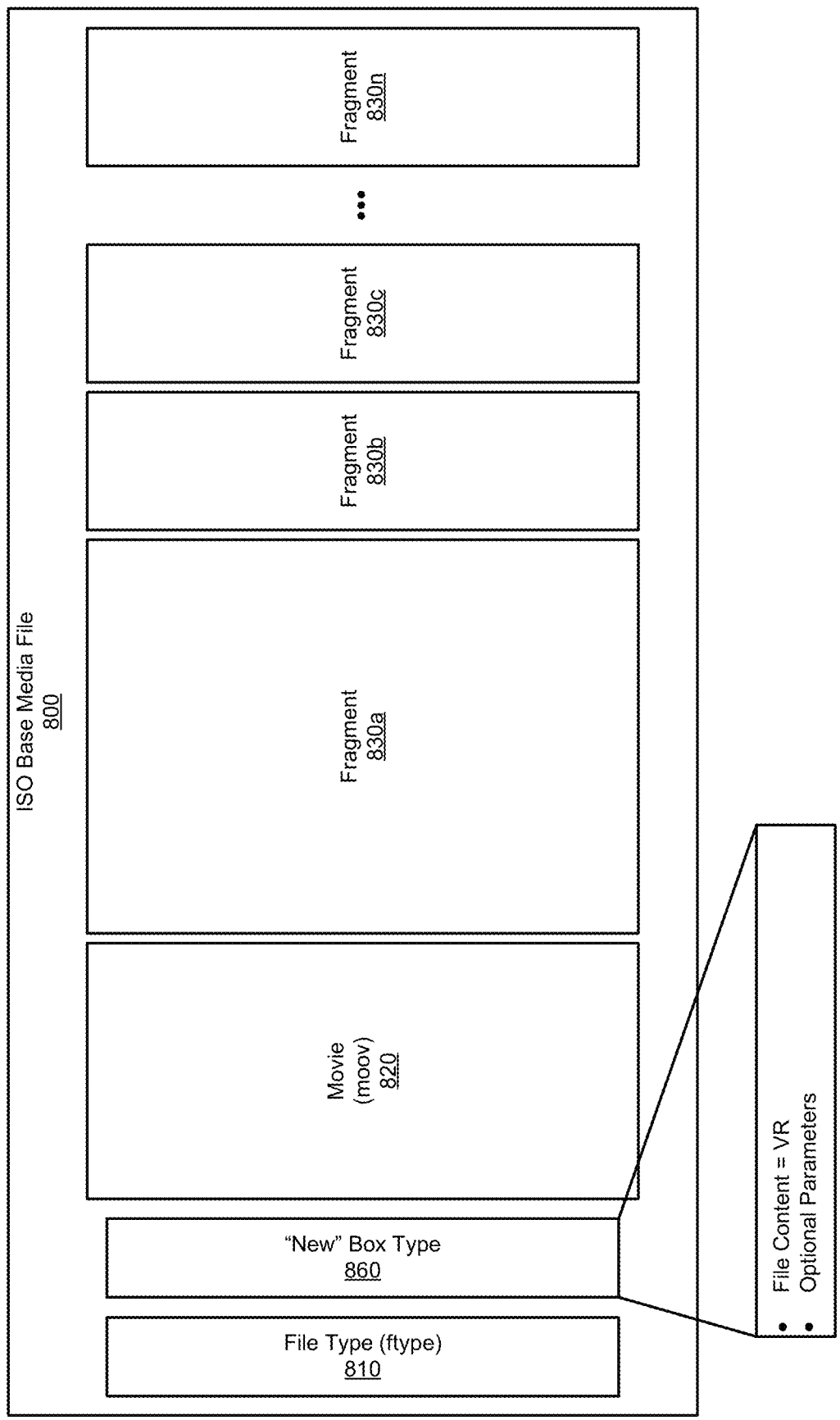

FIG. 8A and FIG. 8B illustrate examples where a top-level box in an ISO base media file 800 is used to indicate that the file 800 includes virtual reality content. In various implementations, using a top-level box indicates that all of the content in the file 800 is virtual reality content. The file 800 can include a file type box 810, which can specify the brand(s) or particular iterations of the ISOBMFF or derivations of the ISOBMFF with which the file 800 is compatible. The file 800 can also include a movie box 820, which can contain the metadata for a presentation. The file 800 can optionally also include one or more fragments 830a, 830b, 830c, 830n, as discussed above.

In the example of FIG. 8A, the file type box 810 can be used to indicate that the file 800 includes virtual reality content. The file type box 810 can be used, for example, to specify a brand value that indicates that the file is compatible with a virtual reality brand. In various implementations, the compatible brands listed in the file type box 810 can also be used to provide optional brand indicators, which can be used to provide virtual-reality related parameters. For example, one compatible brand value can indicate that the virtual reality content is 2-dimensional (2-D) while another compatible brand value can indicate that the virtual reality content is 3-dimensional (3-D). As another example, compatible brand values can be used to indicate a mapping type; that is, whether the spherical representation of the virtual reality or 360-degree video has been mapped to an equirectangular, cube, or pyramid format, or some other format for storage in the file 800. In various implementations, information such as the dimensionality and/or mapping of the video can alternatively or additionally be indicated using optional fields in the file type box 810.

In the example of FIG. 8B, a new box type 860 has been defined. The new box type 860 is a top level box, similar to the file type box 810. Presence of the new box type 860 in the file, and/or indicators in the new box type 860 can be used to indicate that the file 800 includes virtual reality content. For example, the new box type 860 can specify a virtual reality-compatible brand value, and/or include brand value compatible with virtual reality content in a compatible brands list. The new box type 860 can further include optional parameters that can indicate, for example, whether the virtual reality content is 2-D or 3-D 360-degree video, a mapping for the 360-degree video data stored in the file 800, and/or fisheye parameters when the 360-degree video includes fisheye images. Specifying the new box type 860 can avoid the need to modify the file type box 810, as in the example of FIG. 8A. Player devices that cannot recognize the new box type 860 may ignore it.

When the file type box 810 or a new box type 860 defined for the top level of the file is used to indicate that the file 800 includes virtual reality content, in some implementations, the file 800 may not also need to include indicators in other boxes in the file 800 to signal the presence of virtual reality content.

Figure 9:
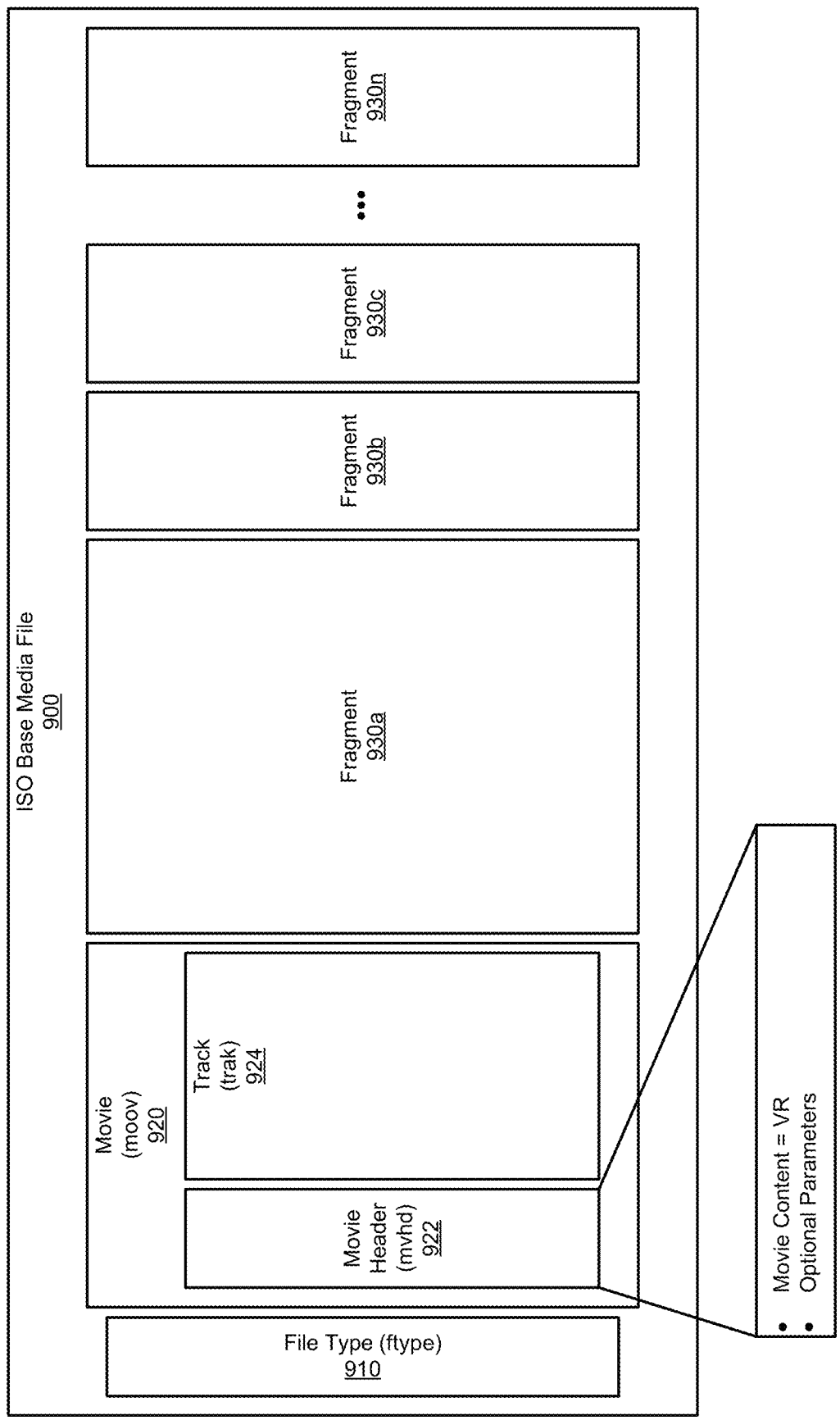
FIG. 9 illustrates an example where a movie-level indication is used in an ISO base media file to indicate that the file includes virtual reality content.

FIG. 9 illustrates an example where a movie-level indication is used in an ISO base media file 900 to indicate that the file 900 includes virtual reality content. The file 900 can include a file type box 910, which can specify the brand(s) or particular iterations of the ISOBMFF or derivations of the ISOBMFF with which the file 900 is compatible. The file 900 can also include a movie box 920, which can contain the metadata for a presentation. The file 900 can optionally also include one or more fragments 930a, 930b, 930c, 930n, as discussed above.

As discussed above, the movie box 920 can include a movie header box 922 and optionally one or more track boxes 924. In the example of FIG. 9, the movie header box 922 is used to indicate that the movie or presentation described by the movie box 920 includes virtual reality content. For example, a reserved bit in the movie header box 922, when set to one value, can indicate that the movie content is virtual reality or 360-degree video, and can be set to another value when the movie may or may not be 360-degree video. In one illustrative example, if one of the reserved bits is used to convey the indication, the bit equal to 1 indicates that the content is 360-degree video content, and the bit equal to 0 indicates that the content may or may not be 360-degree video content. Player devices that are not configured to process the reserved bits may ignore these bits.

Other fields and/or reserved bits in the movie header box 922 can be used to provide optional parameters that pertain to the virtual reality content. For example, the movie header box 922 can include a parameter that indicates whether the virtual reality content is 2-D or 3-D 360-degree video.

As another example, the movie header box 922 can include a parameter that indicates whether the 360-degree video content is pre-stitched or post-stitched. "Pre-stitched" means that the different views captured for the 360-degree video presentation were assembled into a single representation before being stored in the file 900 "Post-stitched" means that the different views were stored individually in the file 900, and will be assembled into a single representation by a decoder device.

Pre-stitched 360-degree video is typically represented as spherical in shape, and is mapped to another shape (e.g., equirectangular, cube mapped, pyramid mapped, or some other shape) that is more convenient for storage. Parameters that indicate the mapping type used are another example of parameters that can be signaled in the movie header box 922, for example, using reserved bits. For example, one reserved bit can be used to convey each mapping type indication. In various implementations, a player device can support multiple mapping types. In these implementations, the movie header box 922 can include a mapping type for each individual track and/or for groups of tracks.

When the movie header box 922 is used to indicate that the movie presentation stored in the movie box 920 includes 360-degree video, in various implementations, other boxes in the movie box 920 may not also need to signal the presence of 360-degree video.

Figure 10:
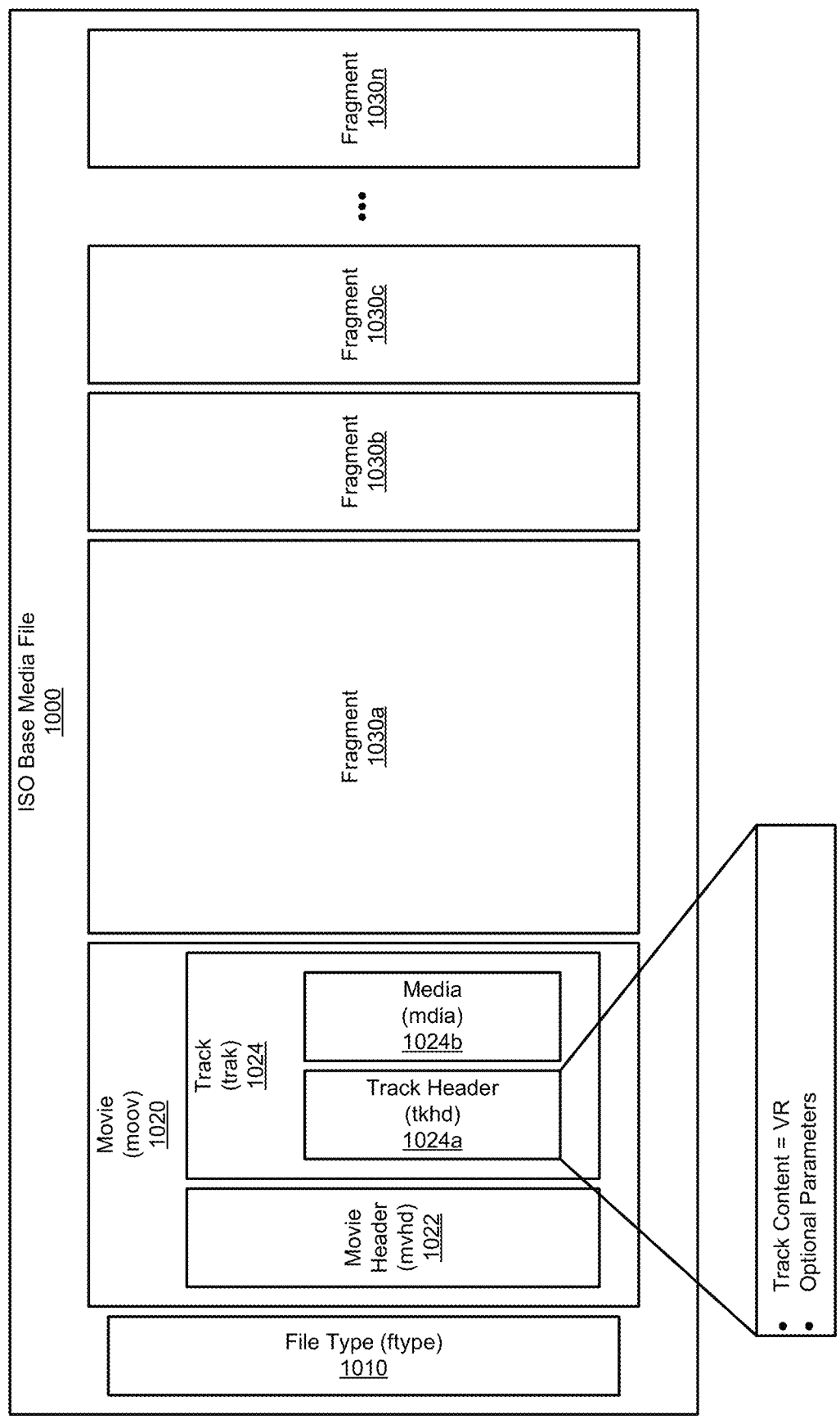
FIG. 10 illustrates an example where a track level indicator is used in an ISO base media file to indicate that the file includes virtual reality content.

FIG. 10 illustrates an example where a track level indicator is used in an ISO base media file 1000 to indicate that the file 1000 includes virtual reality content. The file 1000 can include a file type box 1010, which can specify the brand(s) or particular iterations of the ISOBMFF or derivations of the ISOBMFF with which the file 1000 is compatible. The file 1000 can also include a movie box 1020, which can contain the metadata for a presentation. The file 1000 can optionally also include one or more fragments 1030a, 1030b, 1030c, 1030n, as discussed above.

The movie box 1020 can include a movie header box 1022 and one or more track boxes 1024, as well as other boxes not illustrated here. The movie header box 1022 can include information that describes the presentation as a whole. The track box 1024 can include the information for a track in the presentation. The track box 1024 can include a track header box 1024a and zero or more media data boxes 1024b.

In the example of FIG. 10, the track header box 1024a for a particular track box 1024 is used to indicate that the track described by the track box 1024 is a virtual reality track, meaning that samples referred to by the track include virtual reality data. Virtual reality content in the track can be indicated, for example, using reserved bits in the track header box 1024a. For example, when a particular reserved bit is set to one value, the track includes virtual reality content, and when the bit is set to another value, the track may or may not include virtual reality content. In one illustrative example, if one of the reserved bits is used to convey the indication, the bit equal to 1 indicates that the content is virtual reality content, and the bit equal to 0 indicates that the content may or may not be virtual reality content. In some implementations, the signaling of virtual reality content in the track header box 1024a may depend on what is signaled in the movie header box 1022. For example, when the movie header box 1122 indicates that the movie does not include virtual reality content, then any indication in the track header box 1024a that the track contains virtual reality data can be ignored.

In various implementations, other virtual reality-related parameters can also be signaled in the track header box 1024a. For example, a reserved bit or some other variable can be used to indicate whether the virtual reality or 360-degree video in the track is pre-stitched or post-stitched. When the video in the track is pre-stitched, additional parameters can provide information such as a camera position (e.g., with respect to a point of view and/or viewing angle). When the video in the track is post-stitched, additional parameters can provide a mapping type between the spherical video representation and the representation (e.g., equirectangular, cube map, pyramid map, or some other shape) used to store the data in the file 1000. In various implementations, fisheye parameters, describing fisheye images in the 360-degree video data, can also be stored in the track header box 1024a.

When the track header box 1024a for a track box 1024 is used to signal that the track includes virtual reality content, in some implementations, other boxes in the track box 1024 may not need also signal the presence of virtual reality content in the track.

Figure 11:
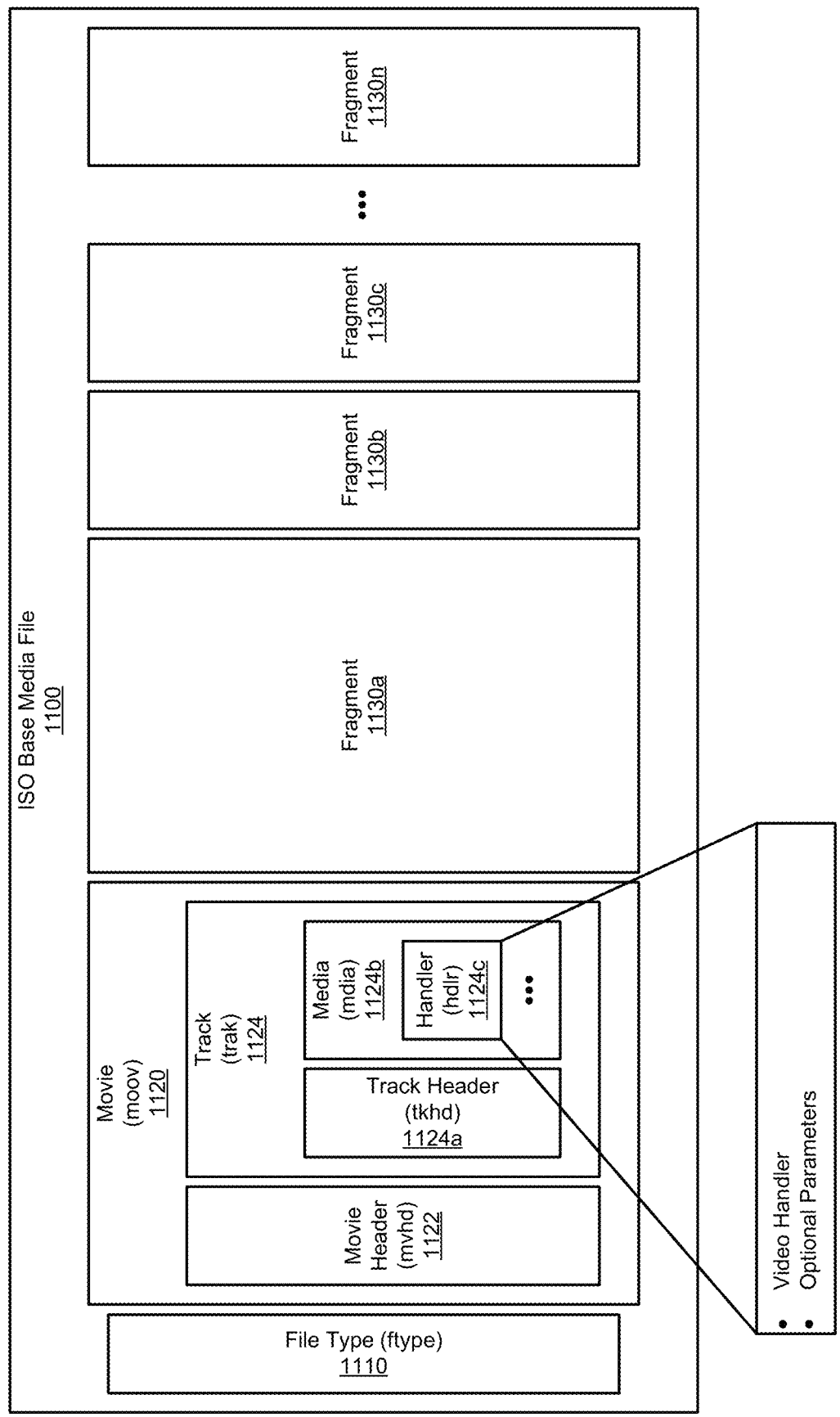
FIG. 11 illustrates one example of an ISO base media file where a handler box is used to signal that the contents of a track include virtual reality content.

In various implementations, when a track in an ISO base media file includes virtual reality content, various additional or alternative approaches can be used to signal the virtual reality content to a player device. FIG. 11 illustrates one example of an ISO base media file 1100 where a handler box 1124c is used to signal that the contents of a track includes virtual reality content. The file 1100 can include a file type box 1110, which can specify the brand(s) or particular iterations of the ISOBMFF or derivations of the ISOBMFF with which the file 1100 is compatible. The file 1100 can also include a movie box 1120, which can contain the metadata for a presentation. The file 1100 can optionally also include one or more fragments 1130a, 1130b, 1130c, 1130n, as discussed above.

The movie box 1120 can include a movie header box 1122 and one or more track boxes 1124, as well as other boxes not illustrated here. The movie header box 1122 can include information that describes the presentation as a whole. The track box 1124 can include the information for a track in the presentation. The track box 1124 can include a track header box 1124a and zero or more media data boxes 1124b.

The media data box 1124b can include a handler box 1124c, among other boxes. The handler box 1124c, which may also be referred to as a handler reference box, can indicate the media type of the track. The media type of the track defines the process by which the media data in the track is presented. Examples of media types include video and audio, among others. The manner in which the media is presented can include a format for the media. For example, a format (e.g., aspect ratio, resolution, frame rate, etc.) that a player device uses to deliver video data in the track can be stored in the video track, and be identified by a video handler version of the handler box 1124c. In some cases, the file 1100 can include a general handler for metadata streams of any type. In these cases, the specific format of the video content can be identified by a sample entry that describes the content.

In some cases, the media data box 1124b can include a handler box 1124c. The handler box 1124c can be used to indicate that the track described by the track box 1124 includes virtual reality data. For example, when the track describes video data, the handler box 1124c can specifically be a video handler box, which can be identified by the box type "vide."

In various implementations, the handler box 1124c can be used to indicate that the media content referenced by the media data box 1124*b* includes virtual reality content. For example, the handler box 1124*c* can include an optional indicator (e.g., in a reserved bit or new variable) that the video content contained in the track is virtual reality or 360-degree video. Video players that are not configured to read the optional indicator may ignore it.

In some implementations, the video handler box can optionally also include parameters that describe the virtual reality content, such as whether the virtual reality or 360-degree video is 2-D or 3-D, whether the 360-degree video is pre-stitched or post-stitched, a mapping for the 360-degree video, and/or fisheye parameters when the 360-degree video includes fisheye images. In various implementations, parameters related to the virtual reality content can be indicated in various other boxes that can be found in the track box 1024. For example, the parameters can be signaled in the track header box 1124*a*. Alternatively or additionally, the parameters can be signaled in a media header box (identified by box type "mdhd"), and/or in a video media header box (identified by box type "vmhd"), which are not illustrated here. Alternatively or additionally, parameters can be indicated in a sample entry, and/or in a newly defined box that can be placed at the top level of the track box 1124.

Figure 12:
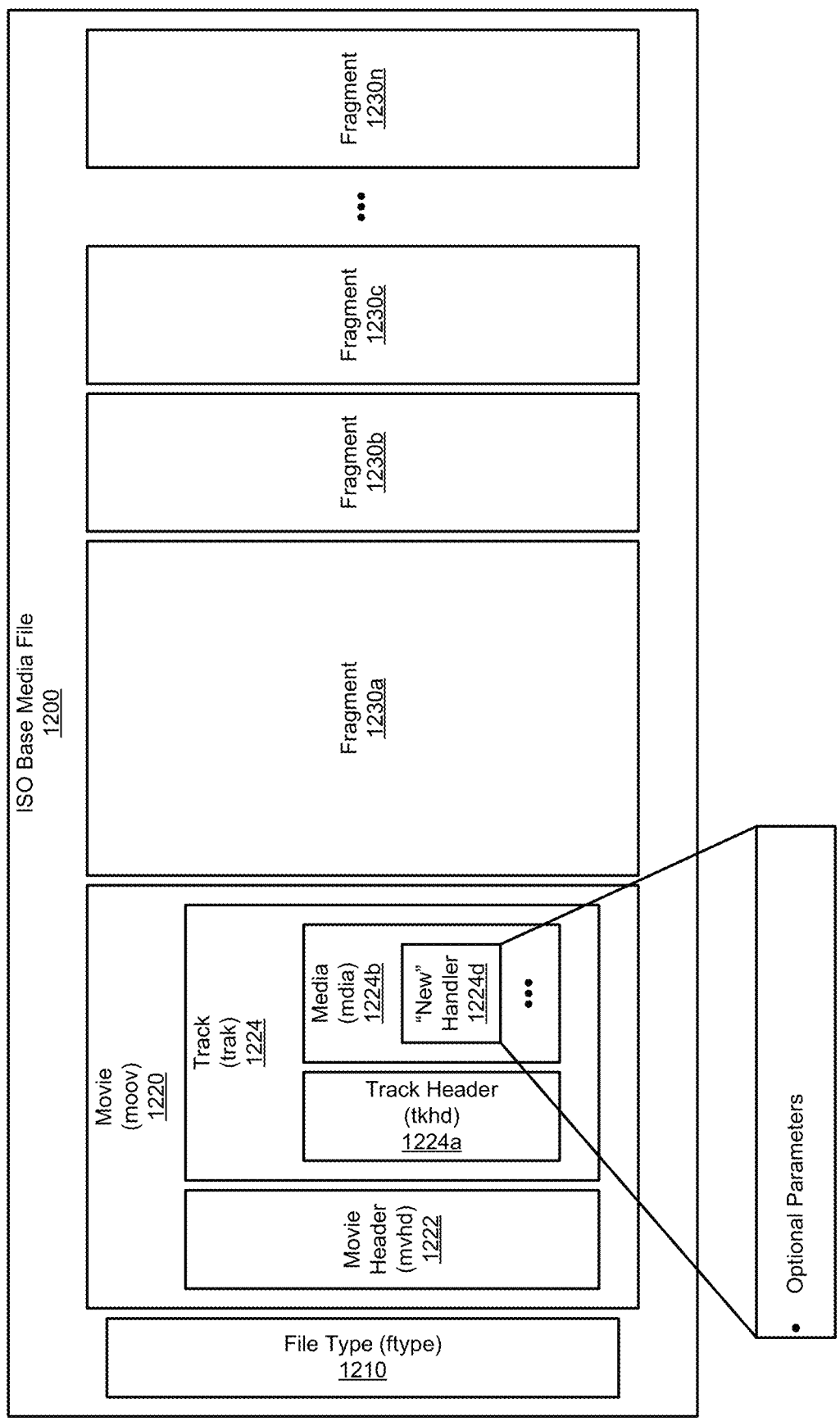
FIG. 12 illustrates an example of an ISO base media file where a new handler box has been defined to indicate that the track includes virtual reality content.

FIG. 12 illustrates an example of an ISO base media file 1200 where a new handler box 1224*d* has been defined to indicate that the track includes virtual reality content. The file 1200 can include a file type box 1210, which can specify the brand(s) or particular iterations of the ISOBMFF or derivations of the ISOBMFF with which the file 1200 is compatible. The file 1200 can also include a movie box 1220, which can contain the metadata for a presentation. The file 1200 can optionally also include one or more fragments 1230*a*, 1230*b*, 1230*c*, 1230*n*, as discussed above.

The movie box 1220 can include a movie header box 1222 and one or more track boxes 1224, as well as other boxes not illustrated here. The movie header box 1222 can include information that describes the presentation as a whole. The track box 1224 can include the information for a track in the presentation. The track box 1224 can include a track header box 1224*a* and zero or more media data boxes 1224*b*.

As discussed above, in some cases the media data box 1224*b* can include a handler box 1224*d*, which can describe a format for presenting the media content described by the media data box 1224*b*. In the example of FIG. 12, a new handler box 1224*d* has been defined, which is specific to virtual reality or 360-degree video data. The new handler box 1224*d* can be identified, for example, by the box type "vrvd." In this example, video players that are not compatible with virtual reality content may not be able to identify the new handler box 1224*d*, and thus may ignore the new handler box 1224*d* and skip any content referred to by the track box 1224. The virtual reality content will thus not be rendered and displayed by a player that is not configured to display virtual reality video.

In some implementations, the new handler box can optionally also include parameters that describe the virtual reality content, such as whether the virtual reality or 360-degree video is 2-D or 3-D, whether the 360-degree video is pre-stitched or post-stitched, a mapping for the 360-degree video, and/or fisheye parameters. In various implementations, parameters related to the virtual reality content can be indicated in various other boxes that can be found in the track box 1224. For example, the parameters can be signaled in the track header box 1224*a*. Alternatively or additionally, the parameters can be signaled in a media header box (identified by box type "mdhd"), and/or in a video media header box (identified by box type "vmhd"), which are not illustrated here. Alternatively or additionally, parameters can be indicated in a sample entry, and/or in a newly defined box that can be placed at the top level of the track box 1224.

Figure 13:
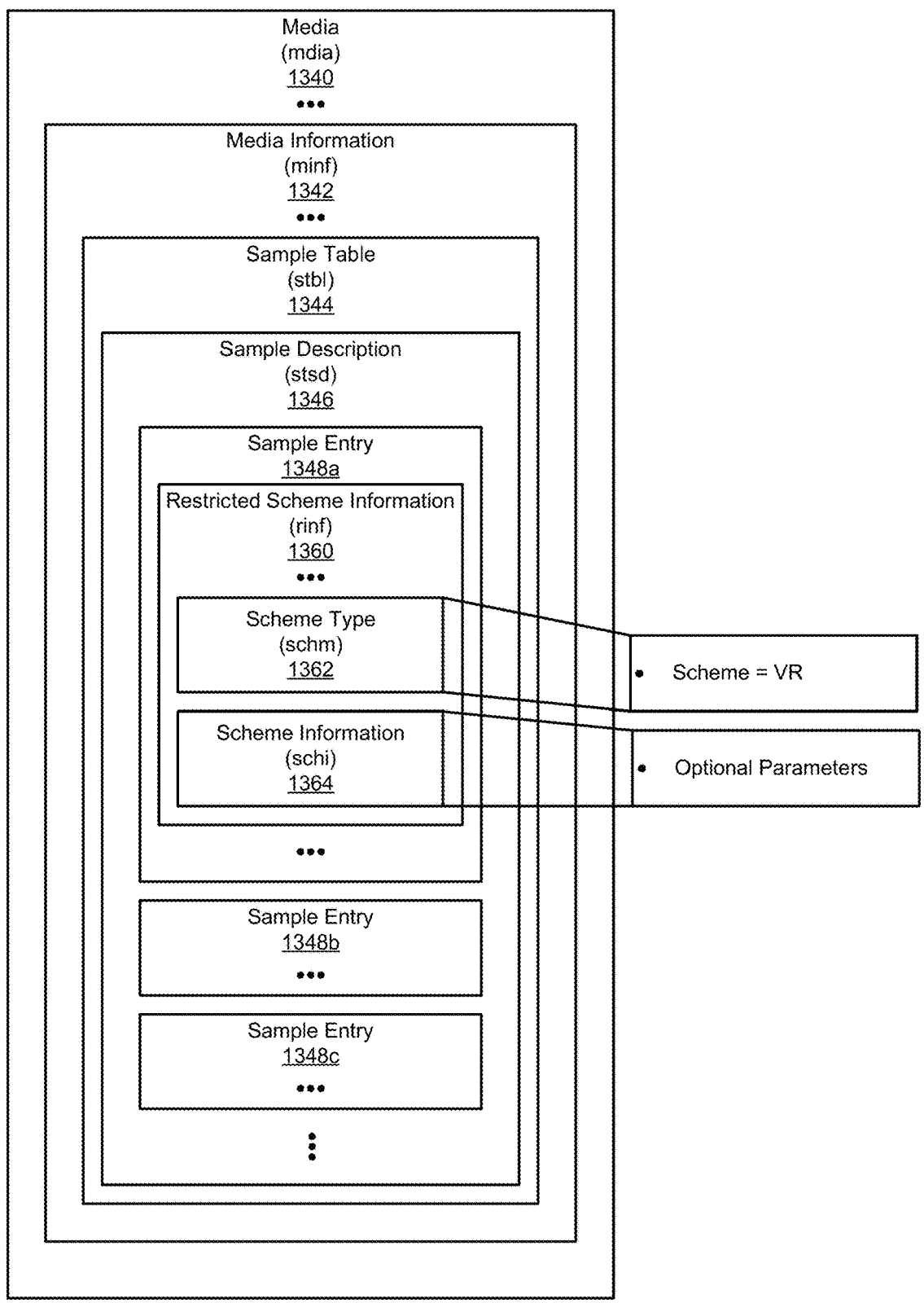
FIG. 13 illustrates an example of a media box that can be included in an ISO base media file.

FIG. 13 illustrates an example of a media box 1340 that can be included in an ISO base media file. As discussed above, a media box can be included in a track box, and can contain objects and information that describe media data in the track. In the illustrated example, the media box 1340 includes a media information box 1342. The media box 1340 can also include other boxes, which are not illustrated here.

The media information box 1342 can contain objects that describe characteristic information about the media in the track. For example, the media information box 1342 can include a data information box, which describes the location of media information in the track. As another example, the media information box 1342 can include a video media header, when the track includes video data. The video media header can contain general presentation information that is independent of the coding of the video media. The media information box 1342 can also include a sound media header when the track includes audio data.

The media information box 1342 can also include a sample table box 1344, as provided in the illustrated example. The sample table box 1344, identified by the box type "stbl," can provide locations (e.g., locations with a file) for the media samples in the track, as well as time information for the samples. Using the information provided by the sample table box 1344, a player device can locate samples in correct time order, determine the type of a sample, and/or determine the size, container, and offset of a sample within a container, among other things.

The sample table box 1344 can include a sample description box 1346, identified by the box type "stsd." The sample description box 1346 can provide detailed information about, for example, the coding type used for a sample, and any initialization information needed for that coding type. The information stored in the sample description box can be specific to a type of the track that includes the samples. For example, one format may be used for the sample description when the track is a video track and a different format may be used when the track is a hint track. As a further example, the format for the sample description may also vary depending on the format of the hint track.

The sample description box 1346 can include one or more sample entries 1348*a*, 1348*b*, 1348*c*. The sample entry type is an abstract class, and thus typically the sample description box includes a specific sample entry box, such as a visual sample entry for video data or an audio sample entry for audio samples, among other examples. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

In the illustrated example, the first sample entry 1348*a* includes a restricted scheme information box 1360. A restricted scheme information box, identified by the box type "rinf," can contain the information required both to understand a restricted scheme applied to a sample and the parameters of the scheme. In some cases, the author of a file may require certain actions form a player device. In these cases, the file can include a restricted scheme information box, which a player device can locate and use to determine the requirements for rendering the media contents of the file. Players that may not be able to render the content can also use the restricted scheme information box to determine that they cannot render the content, and thus should not attempt to process the content. The restricted scheme information box typically includes an original sample entry type, that is, the type of the sample entry prior to any transformation described by the restricted scheme information box.

In various implementations, a restricted scheme can be defined for virtual reality content. In these implementations, a restricted scheme information box 1360 can be added to a sample entry 1348a that includes virtual reality data. The type of a restricted scheme can be specified in a scheme type box 1362, identified by the box type "schm." For example, an encoding corresponding to "vrvd" can be used to identify a restricted scheme for virtual reality content.

The restricted scheme information box 1360 in the illustrated example includes a scheme information box 1364, identified by the box type "schi." The scheme information box 1364 can store information for a specific scheme. For example, when the restricted scheme is for virtual reality content, the scheme information box 1364 can include parameters for the virtual reality content. These parameters can include, for example, whether the virtual reality or 360-degree video is 2-D or 3-D, whether the 360-degree video is pre-stitched or post-stitched, a mapping for the 360-degree video, and/or fisheye parameters when the 360-degree video includes fisheye images. In various implementations, a scheme information box can be defined for virtual reality content, specifically for containing parameters for the virtual reality content.

Using the technique illustrated in FIG. 13, no new boxes need to be added to the ISOBMFF specification that may not be understood by legacy player devices. Even with new boxes, a legacy player device may attempt to play content that the devices cannot identify, and when this content is virtual reality media, the result can be a distorted presentation. In avoiding adding new boxes, a file can be generated for virtual reality content, where the file likely only includes boxes that a legacy player device can identify. The legacy player device can further determine that the device is unable to implement the restricted scheme described by the restricted scheme information box 1364, and thus not attempt to display the virtual reality content.

The technique additionally provides flexibility to both legacy players and players capable of rendering virtual reality content. A legacy player can, for example, determine whether the player understands the virtual reality scheme identified by the restricted scheme information box. When the player device is not able to conform to the restricted scheme, the player device may choose to not render the content in the track at all, or may be able to instead process the original, untransformed samples. The restricted scheme mechanism thus can enable player devices to inspect a file to determine the requirements for rendering a bitstream, and can stop a legacy player device from decoding and rendering files that the device may not be capable of processing.

In various implementations, virtual reality content can alternatively or additionally be included in a supplemental enhancement information (SEI) message in a video bitstream. The SEI message can thus indicate that the bitstream includes virtual reality content. In various implementations, the SEI message can indicate virtual reality content at the level of the file, the movie level, and/or the track level. In various implementations, the SEI message can also include parameters that describe the properties of the 360-degree video (e.g., whether the video is 2-D or 3-D, pre-stitched or post-stitched, fisheye parameters, etc.).

Using one or more of the above-described techniques, fisheye parameters can be included in an ISOBMFF file in a backwards compatible manner. For example, backwards compatibility can be achieved using the following steps:

- The generic sample entry 'resv' is used to replace the 4-character code (4CC) of the sample entry.
- A Restricted Scheme Info box is added to the sample description, leaving all other boxes unmodified.
- The original sample entry type is stored within an Original Format box contained in the Restricted Scheme Info box.
- A new box is defined to contain the 360-degree video metadata information and this new box is included in the Restricted Scheme Info box.
- The virtual reality scheme type is defined, which is included in the SchemeTypeBox.
- The 360-degree video metadata is included in a new box (e.g., called VR video box) that is stored in the SchemeInformationBox.

Provided below are definitions, syntax, and semantics for providing virtual reality or 360-degree video information in an ISOBMFF file. The following sections are drafted as modifications to Section 8.15 of the ISOBMFF specification. Text to be added to this section are shown as underlined text (exampleofaddedtext).

The definition, syntax, and semantics of the virtual reality video information box are as follows:

Definition
Box Type: 'vrvd'
Container: Scheme Information box ('schi')
Mandatory: Yes (when the SchemeType is 'vrvd')
Quantity: One The VR Video box is used to indicate that video contained in the track is a VR video. The VR Video box shall be present when the SchemeType is 'vrvd'.

```
aligned(8) class VrVideoBox extends extends FullBox('vrvd', version = 0, 0) {
  template unsigned int(28) reserved = 0;
  unsigned int(4) vr_mapping_type;
  if(vr_ mapping type == 2)
    FisheyeVideoInfoBox fisheye_video_info_box;
  Box[ ] any_box; // optional
}
```

Semantics vr_mapping_type is an integer that indicates the mapping type from the spherical video to the rectangular format. A zero value indicates the equi-rectangular map. A value one indicates the cube map. Avaluetwoindicatesthatnospecificprojectionmapisused andeachcodedvideopictureisafisheyevideopicturecontai ninganumberof(usuallytwo)circularimages,eachcaptured byafisheyecameralens,andtheformatisdescribedbythe FisheyeVideoInfoBox. Other values are reserved.

The definition, syntax, and semantics of the Fisheye Video Information box introduced are as follows (e.g., additions to Section 8.15 of the ISOBMFF specification):

Definition
Box Type: 'fevi'
Container: Scheme Information box ('vrvd')
Mandatory: Yes (when vr_mapping_type is equal to 2)
Quantity: One The Fisheye Video Information box is used to indicate the format of the fisheye VR video contained in the track. The format information can be used in rendering of the fisheye VR video. This box shall be present when vr_mapping_type of the container 'vrvd' box is equal to 2.

```
aligned(8) class FisheyeVideoInfoBox extends extends FullBox
('fevi', version = 0,0) {
  bit(24) reserved = 0;
  unsigned int(8) num_circular_images;
  for(i=0; i< num_circle_images; i++) {
    unsigned int(32) image_center_x;
    unsigned int(32) image_center_y;
    unsigned int(32) full_radius;
    unsigned int(32) frame_radius;
    unsigned int(32) scene_radius;
    unsigned int(32) image_rotation;
    bit(30) reserved = 0;
    unsigned int(2) image_flip;
    unsigned int(32) image_scale_axis_angle;
    unsigned int(32) image_scale_x;
    unsigned int(32) image_scale_y;
    unsigned int(32) field_of_view;
    bit(16) reserved = 0;
    unsigned int(16) num_compression_curve_pionts;
    for(j=0; j< num_compression_curve_pionts; j++)
      unsigned int(32) compression_curve_x;
      unsigned int(32) compression_curve_y;
  }
}
bit(24) reserved = 0;
unsigned int(8) num_deadzones;
for(i=0; i< num_deadzones; i++)
{
  unsigned int(16) deadzone_left_horizontal_offset;
  unsigned int(16) deadzone_top_vertical_offset;
  unsigned int(16) deadzone_width;
  unsigned int(16) deadzone_height;
  }
}
```

Semantics num_circular_images indicates the number of circular images in the coded picture of each sample this box applies to. Typically, the value is equal to 2, but other non-zero values are also possible.

image_center_x is a fixed-point 16.16 value that indicates the horizontal coordinate, in luma samples, of the center of the circular image in the coded picture of each sample this box applies to.

image_center_y is a fixed-point 16.16 value that indicates the vertical coordinate, in luma samples, of the center of the circular image in the coded picture of each sample this box applies to.

full_radius is a fixed-point 16.16 value that indicates the radius, in luma samples, from the center of the circular image to the edge of the full round image. [See FIG. 4 for an example showing Full Radius, Frame Radius, and Scene Radius]. The full radius may be defined as both horizontal and vertical radius in case the circular image is not perfectly circular and is actually elliptical. If the circular image is cropped, this value is still defined as the theoretically uncropped full radius.

frame_radius is a fixed-point 16.16 value that indicates the radius, in luma samples, from the center of the circular image to the closest edge of the image border. The circular fisheye image may be cropped by the camera frame, therefore this value indicates the radius of a circle wherein pixels are usable.

scene_radius is a fixed-point 16.16 value that indicates the radius, in luma samples, from the center of the circular image to the closest edge of the area in the image where it is guaranteed that there are no obstructions from the camera body itself.

image_rotation is a fixed-point 16.16 value that indicates the amount of rotation, in degrees, of the circular image. Different video camera manufacturers may choose different coordinate systems or layouts for each individual fisheye image captured. The image may be rotated by images +/−90 degrees, or +/−180 degrees, or any other value.

image_flip indicates whether and how the image has been flipped and thus a reverse flipping operation needs to be applied. The value 0 indicates that the image has not been flipped. The value 1 indicates that the image has been vertically flipped. The value 2 indicates that the image has been horizontally flipped. The value 3 indicates that the image has been both vertically and horizontally flipped.

image_scale_axis_angle, image_scale_x, and image_scale_y are three fixed-point 16.16 values that indicate whether and how the image has been scaled along an axis. The axis is defined by a single angle as indicated by the value of image_scale_axis_angle, in degrees. An angle of 0 degrees means a horizontal vector is perfectly horizontal and a vertical vector is perfectly vertical. The values of image_scale_x and image_scale_y indicate the scaling ratios in the directions that are parallel and orthogonal, respectively, to the axis.

field_of_view is a fixed-point 16.16 value that indicates the field of view of the fisheye lens, in degrees. A typical value for a hemispherical fisheye lens is 180.0 degrees.

num_compression_curve_pionts is an integer that indicates the following pairs of compression_curve_x and compression_curve_y.

The list of pairs of compression_curve_x and compression_curve_y are fixed-point 16.16 values that represent the gemometric compression curve of the circular image in relative to the part of the sphere scene that was captured. The array of the compression_curve_x values represents the normalized values of the radius length ranging from 0.0 at the image center, to 1.0 at the image border rim. The array of the compression_curve_y values represents the angles, in degrees, from the camera view direction. For a fisheye lens with a field of view of 180 degrees, the range of degrees along a normalized axis is 0.0 at the center of the image to 90.0 degrees at the border rim of the image.

num_deadzones is an integer that indicates the number of dead zones in the coded picture of each sample this box applies to.

deadzone_left_horizontal_offset, deadzone_top_vertical_offset, deadzone_width and deadzone_height are integer values that indicate the position and size of the deadzone rectangular area in which the pixels are not usable. deadzone_left_horizontal_offset and deadzone_top_vertical_offset indicate the horizontal and vertical coordinates, respectively, in luma samples, of the upper left corner of the deadzone in the coded picture. deadzone_width and deadzone_height indicate the width and height, respectively, in luma samples, of the deadzone. To save bits for representing the video, all pixels within a dead zone should be set to the same pixel value, e.g., all black.

In various implementations, fisheye parameters for a 360-degree video with fisheye images can alternatively or additionally be provided in a Supplemental Enhancement Information (SEI) message. An SEI message is a type of network abstraction layer (NAL) unit used in video bitstreams to provide information about the video. SEI messages can provide, for example, timing information and other supplemental data that may enhance usability of the decoded video signal but are not necessary for decoding the values of the samples in the video pictures.

Figure 14:
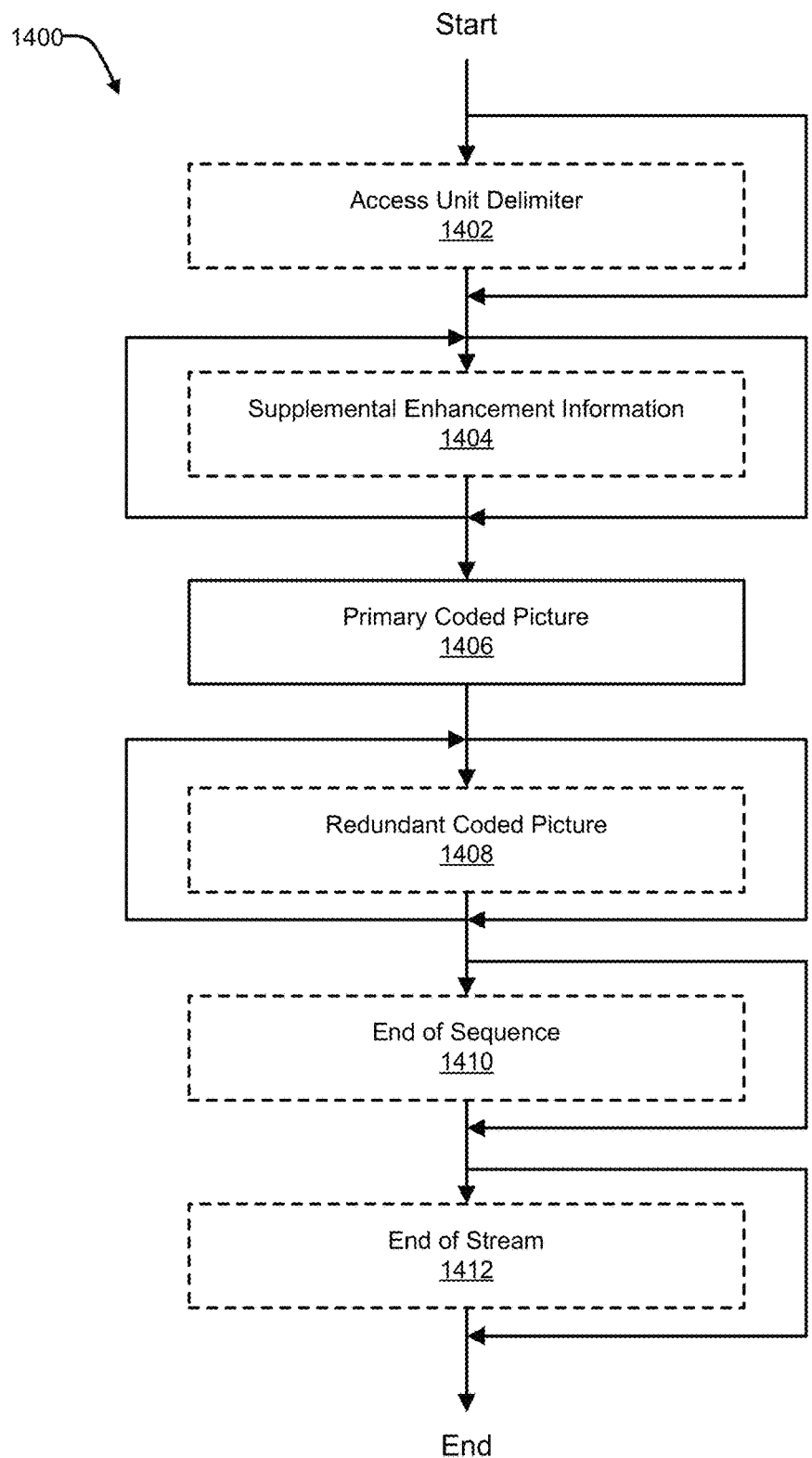
FIG. 14 illustrates an example of an access unit that can be part of a bitstream.

FIG. 14 illustrates an example of an access unit 1400 (AU) that can be part of a bitstream. As discussed further below, a bitstream can include a series of access units. Decoding each access unit results in one decoded picture. Access units such as the example access unit 1400 illustrated here are included in the H.264/AVC and the H.265/HEVC standards.

An access unit 1400, as illustrated in the example of FIG. 14, can include a set of NAL units, which together compose a primary coded picture. An access unit 1400 can include optional NAL units, which are illustrated here in dotted lines. An access unit 1400 can optionally start with an access unit delimiter 1402. The access unit delimiter can aid in locating the start of the access unit. The access unit 1400 can also optionally include supplemental enhancement information 1404 that precedes the primary coded picture 1406. The SEI can contain data such as picture timing information. The primary coded picture 1406 can include video coding layer (VCL) NAL units. The VCL NAL units include slices or slice data partitions that represent the samples of the video picture. Following the primary coded picture 1406 may be some additional VCL NAL units that contain a redundant coded picture 1408. The redundant coded picture 1408 can include redundant representations of areas of the same video picture, and are available for use by a decoder in recovering from loss or corruption of the data in the primary coded picture 1406. Decoders are not required to decode redundant coded pictures if they are present.

When the primary coded picture 1406 is the last picture of a coded video sequence, the access unit 1400 can include an end of sequence 1410 NAL unit, to indicate the end of the sequence. When the primary coded picture 1406 is also the last coded picture in the bitstream, the access unit 1400 can also include an end of stream 1412 NAL unit (also referred to as an end of bitstream NAL unit).

The NAL units in an access unit is described further below.

In various implementations, an SEI NAL unit can be used to provide a fisheye parameters with encoded 360-degree fisheye pictures. Provided below is an example syntax and semantics for an SEI NAL unit that includes fisheye parameters.

| 360_fisheye_video_info( payloadSize ) { | Descriptor |
|---|---|
| num_circular_images_minus1 | ue(v) |
| for( i = 0; i <= num_circular_images_minus1; i++ ) { | |
| image_center_x_int[ i ] | ue(v) |
| image_center_x_frac[ i ] | ue(v) |
| image_center_y_int[ i ] | ue(v) |
| image_center_y_frac[ i ] | ue(v) |
| full_radius_int[ i ] | ue(v) |
| full_radius_frac[ i ] | ue(v) |
| picture_radius_int[ i ] | ue(v) |
| picture_radius_frac[ i ] | ue(v) |
| scene_radius_int[ i ] | ue(v) |
| scene_radius_frac[ i ] | ue(v) |
| image_rotation_int[ i ] | ue(v) |
| image_rotation_frac[ i ] | ue(v) |
| image_flip_idc[ i ] | u(2) |
| image_scale_axis_angle_int[ i ] | ue(v) |
| image_scale_axis_angle_frac[ i ] | ue(v) |
| image_scale_x_int[ i ] | ue(v) |
| image_scale_x_frac[ i ] | ue(v) |
| image_scale_y_int[ i ] | ue(v) |
| image_scale_y_frac[ i ] | ue(v) |
| field_of_view_int[ i ] | ue(v) |
| field_of_view_frac[ i ] | ue(v) |
| num_compression_curve_pionts[ i ] | ue(v) |
| for( j = 0; j < num_compression_curve_pionts[ i ]; | |

-continued

| 360_fisheye_video_info( payloadSize ) { | Descriptor |
|---|---|
| j++ ) { | |
| compression_curve_x_int[ i ][ j ] | |
| compression_curve_x_frac[ i ][ j ] | |
| compression_curve_y_int[ i ][ j ] | |
| compression_curve_y_frac[ i ][ j ] | |
| } | |
| } | |
| num_deadzones | ue(v) |
| for( i = 0; i < num_deadzones; i++ ) { | |
| deadzone_left_horizontal_offset[ i ] | ue(v) |
| deadzone_top_vertical_offset[ i ] | ue(v) |
| deadzone_width[ i ] | ue(v) |
| deadzone_height[ i ] | ue(v) |
| } | |
| } | |

Semantics

The presence of the 360 fisheye video information SEI message in a Coded Layer-wise Video Sequence (CLVS) indicates that each coded video picture in the CLVS is a 360 degree fisheye video picture containing a number of (usually two) circular images captured by fisheye camera lens. The information of the 360 degree fisheye video carried in the 360 fisheye video information SEI message can be used by a receiver to directly render the 360 fisheye video in a virtual reality environment.

The 360 fisheye video information SEI message applies to the CLVS that contains the SEI message, also referred to as the current CLVS. When present in a CLVS the 360 fisheye video information SEI message shall be present in the first access unit of the CLVS and may be present in other access units of the CLVS.

num_circular_images_minus1 plus 1 specifies the number of circular images in each coded picture in the current CLVS. Typically, the value of num_circular_images_minus1 is equal to 1, but other non-zero values are also possible.

image_center_x_int[i] and image_center_x_frac[i] specify the integer and fractional parts, respectively, of the horizontal coordinate, in luma samples, of the center of the i-th circular image in each coded picture in the current CLVS.

image_center_y_int[i] and image_center_y_frac[i] specify the integer and fractional parts, respectively, of the vertical coordinate, in luma samples, of the center of the i-th circular image in each coded picture in the current CLVS.

full_radius_int[i] and full_radius_frac[i] specify the integer and fractional parts, respectively, of the radius, in luma samples, from the center of the circular i-th circular image to the edge of the full round image. [See FIG. 4 for an example]. The full radius may be defined as both horizontal and vertical radius in case the circular image is not perfectly circular and is actually elliptical. If the circular image is cropped, this value is still defined as the theoretically uncropped full radius.

picture_radius_int[i] and picture_radius_frac[i] specify the integer and fractional parts, respectively, of the radius, in luma samples, from the center of the i-th circular image to the closest edge of the image border. [See FIG. 4 for an example]. The circular fisheye image may be cropped by the camera frame, therefore this value indicates the radius of a circle wherein pixels are usable.

scene_radius_int[i] and scene_radius_frac[i] specify the integer and fractional parts, respectively, of the radius, in luma samples, from the center of the i-th circular image to the closest of the area in the image where it is guaranteed that there are no obstructions from the camera body itself. [See FIG. 4 for an example].

image_rotation_int[i] and image_rotation_frac[i] specify the integer and fractional parts, respectively, of the amount of rotation, in degrees, of the i-th circular image. Different video camera manufacturers may choose different coordinate systems or layouts for each individual fisheye image captured. The image may be rotated by images +/−90 degrees, or +/−180 degrees, or any other value. [FIG. 3 shows two images, one rotated +90 degrees, the other −90 degrees (i.e., +270 degrees)].

image_flip_idc[i] indicates whether and how the i-th cicular image has been flipped and thus a reverse flipping operation needs to be applied. The value 0 indicates that the image has not been flipped. The value 1 indicates that the image has been vertically flipped. The value 2 indicates that the image has been horizontally flipped. The value 3 indicates that the image has been both vertically and horizontally flipped.

image_scale_axis_angle_int[i] and image_scale_axis_angle_frac[i] specify the integer and fractional parts, respectively, of the angle, in degrees, of the scaling axis along which the i-th circular image has been scaled. An angle of 0 degrees means a horizontal vector is perfectly horizontal and a vertical vector is perfectly vertical.

image_scale_x_int[i] and image_scale_x_frac[i] specify the integer and fractional parts, respectively, of the scaling ratio of the direction that is parallel to the scaling axis for the i-th circular image.

image_scale_y_int[i] and image_scale_y_frac[i] specify the integer and fractional parts, respectively, of the scaling ratio of the direction that is orthogonal to the scaling axis for the i-th circular image.

field_of_view_int[i] and field_of_view_frac[i] specify the integer and fractional parts, respectively, of the field of view of the fisheye lens, in degrees, for the i-th circular image. A typical value for a hemispherical fisheye lens is 180.0 degrees.

num_compression_curve_pionts[i] specifies the number of the following lists of compression_curve_x_int[i], compression_curve_x_frac[i], compression_curve_y_int[i], and compression_curve_y_frac[i].

num_compression_curve_pionts[i] specifies the number of the following lists of compression_curve_x_int[i], compression_curve_x_frac[i], compression_curve_y_int[i], and compression_curve_y_frac[i].

compression_curve_x_int[i][j] and compression_curve_x_frac[i][j] specify the j-th normalized value of the radius length, ranging from 0.0 at the image center to 1.0 at the image border rim, for the i-th circular image.

compression_curve_y_int[i][j] and compression_curve_y_frac[i][j] specify the j-th angle, in degrees, from the camera view direction for the i-th circular image. For a fisheye lens with a field of view of 180 degrees, the range of degrees along a normalized axis is 0.0 at the center of the image to 90.0 degrees at the border rim of the image.

The list of pairs of normalized values of the radius length and the angle represents the gemometric compression curve of the circular image in relative to the part of the sphere scene that was captured by the i-th fisheye camera lens.

num_deadzones specifies the number of dead zones in each coded picture in the current CLVS.

deadzone_left_horizontal_offset[i], deadzone_top_vertical_offset[i], and deadzone_width[i], and deadzone_height[i] specify the position and size of the i-th deadzone rectangular area in which the pixels are not usable. deadzone_left_horizontal_offset[i] and deadzone_top_vertical_offset[i] specify the horizontal and vertical coordinates, respectively, in luma samples, of the upper left corner of the i-th deadzone in each coded picture in the current CLVS. deadzone_width[i] and deadzone_height[i] specify the width and height, respectively, in luma samples, of the i-th deadzone in each coded picture in the current CLVS. Note that to save bits for representing the video, all pixels within a deadzone should be set to the same pixel value, e.g., all black.

In various implementations, fisheye parameters for a 360-degree video with fisheye images can alternatively or additionally be provided using the Session Description Protocol (SDP). SDP can be used to describe multimedia communication sessions. Such descriptions can be used, for example, for session announcement, session invitation, and parameter negotiation. SDP is not used to deliver the media itself, but can be used between endpoints for negotiation of the media type, format, and associated properties. A set of properties and parameters are often referred to as a session profile. SDP was originally a component of the Session Announcement Protocol (SAP), but found other uses in conjunction with Real-time Transfer Protocol (RTP), Real-time Streaming Protocol (RTSP), Session Initiation Protocol (SIP) and as a standalone format for describing multicast sessions. SDP is described in RFC 4566.

Figure 15:
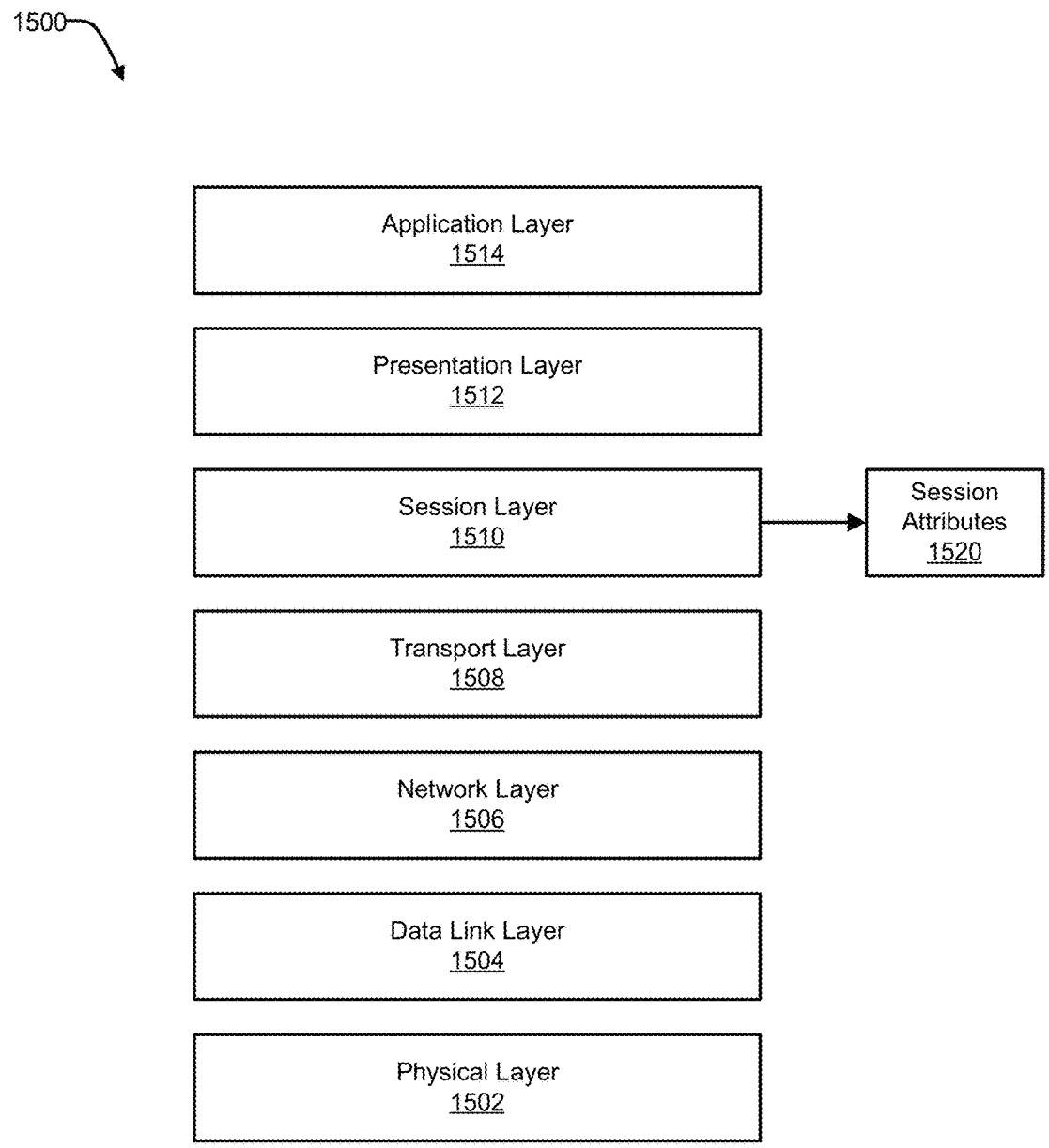
FIG. 15 illustrates an example of the Open Systems Interconnect model for network communications.

FIG. 15 illustrates an example of the Open Systems Interconnect (OSI) model 1500 for network communications. Within this model, SDP is implemented in the session layer 1510, where connection management, error recovery, security, remote operation, and other functions occur. As discussed further below, fisheye parameters can be included in session attributes 1520, which are exchanged in the session layer 1510.

The OSI model 1500 standardizes communication functions, and compliance enables interoperability between diverse communication systems. Each layer in the model 1500 serves the layer above and is served by the layer below. The physical layer 1502 defines transmission and reception of raw bit streams over a physical medium. The data link layer 1504 defines reliable transmission of data frames between two nodes. Operations such as physical addressing are handled in the data link layer 1504. The network layer 1506 defines the structure and management of a multi-node network, including addressing, routing, and traffic control. Operations such as packet fragmentation and logical addressing occur in the network layer 1506. The transport layer 1508 defines reliable transmission of data segments between points on a network, including segmentation, acknowledgment, and multiplexing. Operations such as end-to-end connection management, message segmentation, message sequencing, reliability, and flow control can occur in the transport layer 1508. The session layer 1510 defines management of sessions, which are continuous exchanges of information in the form of multiple back-to-back transmissions between two nodes. As noted, previously, operations such as connection management, error recovery, security, and remote operation can occur in the session layer 1510. The presentation layer 1512 defines translation of data between a networking service and an application, including character encoding, data compression, and encryption and/or decryption. The application layer 1514 includes high-level Application Programming Interfaces (APIs), including resource sharing, remote file access, and other operations.

In various implementations, fisheye parameters can be included in a session description and/or in a media description in an SDP message. For example, a field can be added or modified in the session description and/or the media description to indicate the presence of 360-degree video in streaming content. Additionally, in some implementations, parameters relating to the virtual reality content can also be added to an SDP message. Such parameters can include, for example, whether the virtual reality content is 2-D or 3-D, whether the content is pre-stitched or post-stitched, a mapping used to store the data, and/or parameters describing fisheye images in the video data. In this and other examples, SDP can be used in RTP-based streaming, broadcast, and/or telepresence or conference applications to indicate that media content includes virtual reality content.

Provided below is an example of the fields in a session description. Optional fields are specified with "=*" and in the below example, 360-degree video parameters can be specified using the session attribute lines and/or the media attribute lines.

Session Description
v=(protocol version number, currently only 0)
o=(originator and session identifier: username, id, version number, network address)
s=(session name: mandatory with at least one UTF-8-encoded character)
i=* (session title or short information)
u=* (URI of description)
e=* (zero or more email address with optional name of contacts)
p=* (zero or more phone number with optional name of contacts)
c=* (connection information—not required if included in all media)
b=* (zero or more bandwidth information lines)
One or more Time descriptions ("t-" and "r-" lines; see below)
z=* (time zone adjustments)
k=* (encryption key)
a=* (zero or more session attribute lines)
Zero or more Media descriptions (each one starting by an "m=" line; see below)
Time Description
t=(time the session is active)
r=* (zero or more repeat times)
Media Description
m=(media name and transport address)
i=* (media title or information field)
c=* (connection information—optional if included at session level)
b=* (zero or more bandwidth information lines)
k=* (encryption key)
a=* (zero or more media attribute lines—overriding the Session attribute lines)

In various implementations, fisheye parameters for 360-degree video that includes fisheye images can alternatively or additionally be provided in video data transmitted using DASH. For example, 360-degree video can be indicated at the media presentation level of a DASH presentation. A media presentation, as defined by the DASH specification, is a collection of data for a bounded or unbounded media presentation (e.g., a single motion picture or continuous live stream, among other examples). A media presentation can be described by a media presentation description, a document contains metadata that can be used by a DASH client to construct the appropriate HTTP uniform resource locators (URLs) to access segments of the media presentation.

Figure 16:
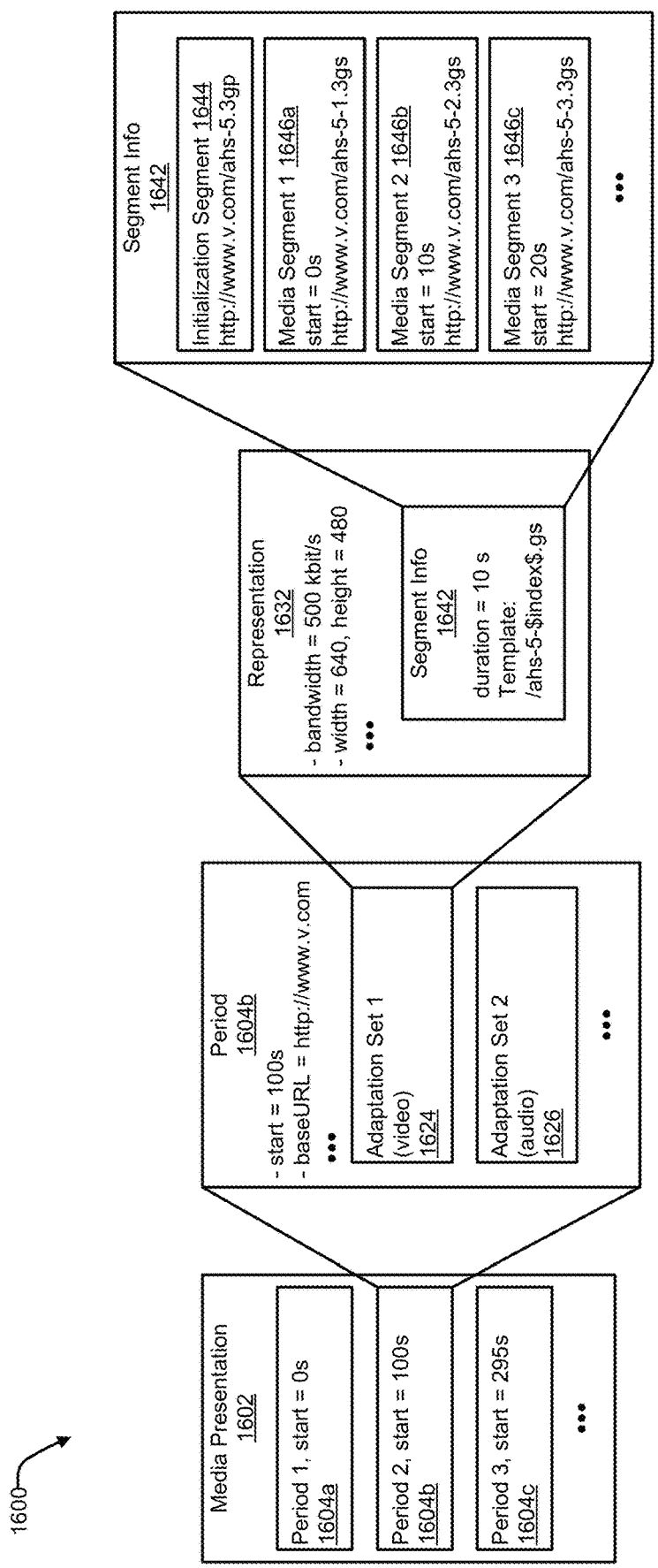
FIG. 16 illustrates an example of a DASH presentation for streaming video content.

FIG. 16 illustrates an example of a DASH presentation 1600 for streaming video content. The video content is contained in a media presentation 1602, which can describe a contiguous video stream. The media presentation 1602 can include a media presentation description (MPD), which can also be referred to as a manifest. The MPD is a document, formatted using for example eXtensible Markup Language (XML), that contains information about media segments in the media presentation 1602. This information can include, for example, the relationships between segments and information that can be used to choose between the segments. The MPD can also include other data that client devices (e.g., devices receiving the content) can use.

In various implementations, the media presentation description can be used to indicate that the media content described by the media presentation description includes virtual reality content. For example, an element can be modified or added to the schema for the media presentation description, where the element then signals virtual reality content. In various implementations, attributes can also be modified or added to the media presentation description to provide information about the virtual reality content, such as whether the content is 2-D or 3-D, whether the content is pre-stitched or post-stitched, a mapping for the video frames when the content is post-stitched, and/or fisheye parameters, such as are discussed above. In some implementations, a virtual reality indicator in the media presentation description indicates that all of the content in the presentation is formatted for virtual reality.

The media presentation 1602 can be divided into periods 1604*a*-1604*c*. A period, as defined by DASH, is an interval of time within the media presentation 1602. The presentation thus consists of a contiguous sequence of periods 1604*a*-1604*c*. A period 1604*a*-1604*c* can be described by, for example, a start time, where the start time indicates a time at which the interval of time in the period starts. Stated another way, the start time is an offset from time zero.

In various implementations, the elements and/or attributes of a period can be used to indicate that the period includes 360-degree video content. For example, an element can be modified or added to the schema for the period, where the element then signals virtual reality content. In various implementations, attributes can also be modified or added to the period to provide information about the virtual reality content, such as whether the content is 2-D or 3-D, whether the content is pre-stitched or post-stitched, a mapping for the video frames when the content is post-stitched, and/or fisheye parameters. In some implementations, a virtual reality indicator in the period indicates that the content in the period is formatted for virtual reality.

Within a period 1604*b* (e.g., Period 2 in the illustrated example), media content can have a consistent set of encodings, including, for example, an average bitrate, a language, a caption setting, a subtitle setting, etc. The period 1604*b* can also provide a source (e.g., a base Uniform Resource Locator (URL)) where the content can be streamed from. The content in the period 1604*b* can be arranged into adaptation sets 1624, 1626. An adaptation set represents a set of interchangeable encoded versions of one or more media content components. For example, a period may include one adaptation set 1624 for the main video component and a separate adaptation set 1626 for the main audio component. When there is other content available, such as captions or audio descriptions, each of these can have a separate adaptation set.

In various implementations, 360-degree video information can be included in an adaptation set. For example, an element can be modified or added to the schema for the adaptation set, where the element then signals 360-degree video content. In various implementations, attributes can also be modified or added to the adaptation set to provide information about the virtual reality content, such as whether the content is 2-D or 3-D, whether the content is pre-stitched or post-stitched, a mapping for the video frames when the content is post-stitched, and/or fisheye parameters. In some implementations, a 360-degree video indicator in the adaptation set indicates that each of the representations in the adaptation set includes 360-degree video content.

An adaptation set (e.g., the video adaptation set 1624) can contain multiple alternate representations 1632. A representation describes a deliverable encoded version of one or several media content components. Any single representation within an adaptation set can be used to render the media content components in the period. Different representations in one adaptation sent may be considered perceptually equivalent, meaning that a client device can switch dynamically from one representation to another representation within the adaptation set in order to adapt to network conditions or other factors. For example, each representation can have a particular bandwidth, and frame height and width, as well as other information such as a frame rate or encoding type. A representation 1632 can further include segment information 1642 that describes the segments in the media presentation 1602.

In various implementations, information about 360-degree video content can be provided in a representation 1632. For example, an element can be modified or added to the schema for the representation, where the element then indicates virtual reality content. In various implementations, attributes can also be modified or added to the representation to provide information about the virtual reality content, such as whether the content is 2-D or 3-D, whether the content is pre-stitched or post-stitched, and/or a mapping for the video frames when the content is post-stitched. In some implementations, a virtual reality indicator in the representation indicates that the content of the representation was formatted for virtual reality.

The segment information 1642 can describe an initialization segment 1644 and one or more media segments 1646*a*-1646*c*. The initialization segment 1644 can include some content that precedes the media itself. Each media segment 1646*a*-1646*c* includes a portion of the overall period 1604*b*. The media segments 1646*a*-1646*c* can be described by a start time relative to the start of the period 1604*b*, and a source location (e.g., a URL).

Figure 17:
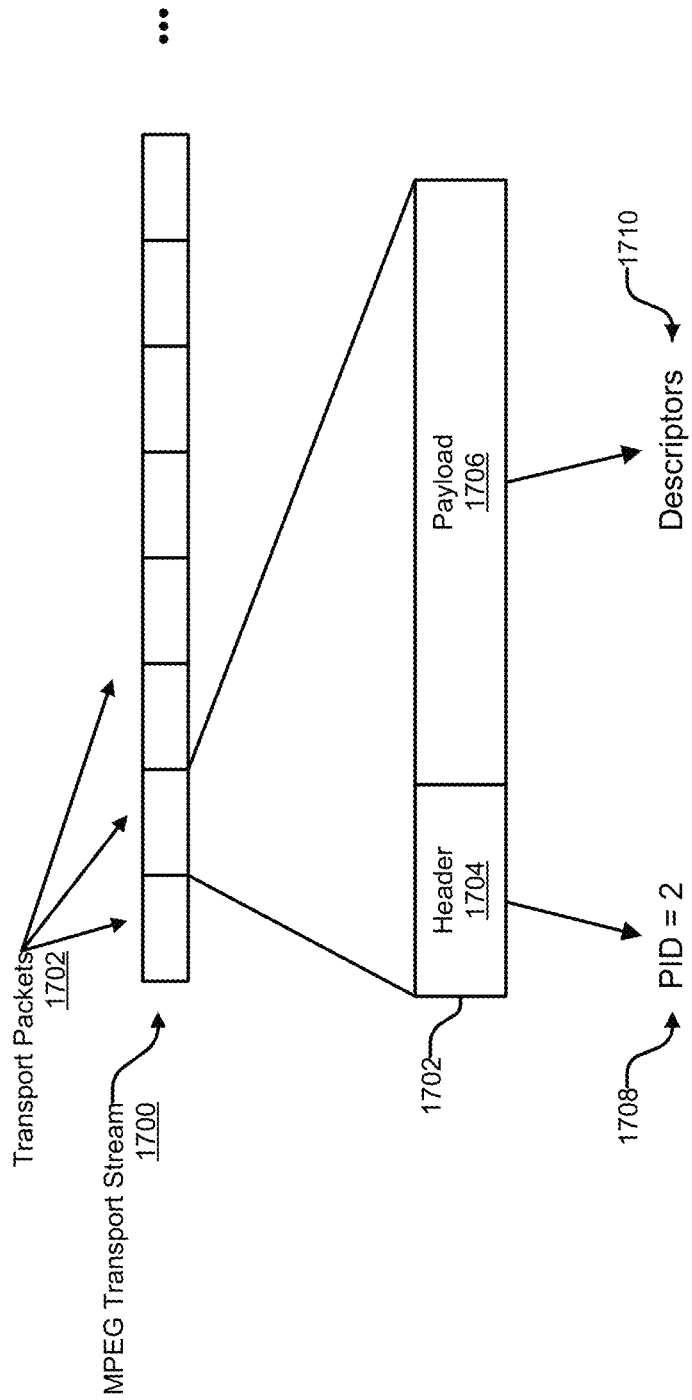
FIG. 17 illustrates an example of an MPEG transport stream.

In various implementations, fisheye parameters for 360-degree video that includes fisheye content cant alternatively or additionally be provided in an MPEG transport stream (MPEG-TS). FIG. 17 illustrates an example of an MPEG transport stream 1700. MPEG-TS is a container format used to transmit and store audio, video, and programming data. MPEG-TS specifies a container format encapsulating packetized elementary streams, with error correction and stream synchronization features for maintaining transmission integrity when the signal is degraded. MPEG-TS is intended for streamlining over unreliable transmission mediums, such as terrestrial and satellite broadcast.

An MPEG transport stream 1700 includes multiple transport packets 1702. A packet is a basic unit of data in a transport stream. The transport stream itself is a sequence of packets, without any global header. Each packet 1702 includes a header 1704 and a payload 1706. The header 1704 provides information about the packet 1702, including, for example, describing the contents of the payload, the packets sequence with respect to other packets, error information, and so on.

Among other fields, the header 1704 can include a packet identifier 1708 (PID). The packet identifier 1708 can describe the data included in the payload 1706. For example, PID=2 indicates that the payload 1706 includes some or all of a transport stream descriptor table (TSDT). The transport stream descriptor table can contain descriptors 1710 relating to the transport stream 1700.

In various implementations, descriptors can be added to the transport stream descriptor table that describe 360-degree video content. For example, descriptors can be added for 360-degree video parameters, such as whether the content is 2-D or 3-D, whether the content is pre-stitched or post-stitched, a mapping for the video frames when the content is post-stitched, and/or fisheye parameters. In these and other examples, a client device that is receiving the transport stream 1700 can use the parameters to decode and/or remap video data transmitted in the transport stream 170.

As another example, Multimedia Broadcast Multicast Services (MBMS) can be used to indicate 360-degree video content when the content is transmitted over 3GPP cellular networks. MBMS is a point-to-multipoint interface specification that can provide efficient delivery of broadcast and multicast services, both within a cell and within the core network. Target applications for MBMS include mobile television, live video and audio streamlining, file delivery, and delivery of emergency alerts.

In various implementations, signaling of 360-degree video content, as well as parameters related to the content can be accomplished by adding a new feature to the MBMS feature requirement list. In various implementations, signaling of 360-degree video content can be accomplished in a similar fashion for other broadcast and multicast applications.

FIG. 18 illustrates an example of a process 1800 for encoding 360-degree fisheye video with parameters that describe the fisheye images in the video. At 1802, the process 1800 includes obtaining 360-degree video data captured by an omnidirectional camera, wherein a video frame of the 360-degree video data includes an image of a scene, and wherein, the image, the scene is warped into a circular region of the image. The circular region can also be referred to as a fisheye image.

At 1804, the process 1800 includes obtaining parameters associated with the omnidirectional camera, wherein parameters describe the circular region of the image. The parameters include those described with respect to FIG. 5, FIG. 6A, and FIG. 6B, among other parameters. In some implementations, the parameters are obtained directly from the camera. In some implementations, the parameters are embedded in the 360-degree video data as metadata.

At 1806 of FIG. 18, the process 1800 includes encoding the 360-degree video data. In various implementations, the 360-degree video is encoded without any transformation or manipulation of the data, such that the fisheye images in the video are encoded as captured by the omnidirectional camera. In various implementations, the 360-degree video is encoded using the AVC or HEVC standard, or some other video encoding standard.

At 1808, the process 1800 includes generating encoded video data, wherein the encoded video data includes the encoded 360-degree video data and the parameters associated with the omnidirectional camera.

In some implementations, generating the encoded video data includes writing the encoded 360-degree video to a file, where the file is formatted according to an ISOBMFF file format. In these implementations, the parameters can be included at a file level, a movie level, and/or a track level of the file. In some implementations, the parameters can be included in a restricted scheme information box in the file.

In some implementations, generating the encoded video data includes encoding the parameters in an SEI message. In these implementations, the SEI message can be included in the encoded 360-degree video data. For example, the SEI message, which can be a NAL unit, can be included in an access unit of a bitstream that includes the encoded 360-degree video data.

In some implementations, generating the encoded video data includes encoding the parameters as SDP attributes. In these implementations, the parameters can be communicated to a destination using the session data protocol.

In some implementations, generating the encoded video data includes writing the parameters into an MPD file. The MPD file can be included in a DASH presentation of the encoded video data. The DASH presentation can be streamed from one location to another.

In some implementations, generating the encoded video data includes writing the parameters into an MPEG transport stream. In these implementations, the parameters can be included as descriptors in the transport stream. The parameters can then be communicated to a destination using the MPEG transport stream.

FIG. 19 illustrates an example of a process 1900 for decoding encoded video data that includes 360-degree video. At 1902, the process 1900 includes obtaining encoded video data, wherein the encoded video data includes 360-degree video data captured by an omnidirectional camera and parameters associated with the omnidirectional camera. The parameters can include those described above with respect to FIG. 5, FIG. 6A, and FIG. 6B, among other parameters.

At 1904 of FIG. 19, the process 1900 includes decoding the encoded video data to produce the 360-degree video data, wherein a frame from the 360-degree video data includes an image of a scene, and wherein, in the image, the scene is warped into a circular region of the image. The circular region can also be referred to as a fisheye image.

At 1906, the process 1900 includes generating a 360-degree video presentation, wherein generating the 360-degree video presentation includes using the parameters to map the circular region to a 360-degree format.

In some implementations, the encoded video data is obtained from a file, wherein the file is formatted according an ISOBMFF file format. In these implementations the parameters can be in the file at a file level, a movie level, and/or a track level. In some implementations, the parameters can be in a restricted scheme information box in the file.

In some implementations, the parameters are decoded from an SEI message. In these implementations, the SEI message can be included in the encoded video data. For example, the SEI message can be a NAL unit in an encoded bitstream that includes the 360-degree video data. In various implementations, the SEI message can be formatted according the AVC or HEVC standard, or some other standard.

In some implementations, decoding the encoded video data includes obtaining the parameters from SDP parameters. In these implementations, the encoded video data can be obtained over a network, using the SDP protocol.

In some implementations, decoding the encoded video data includes obtaining the parameters from an MPD file. In these implementations, the encoded video data can be obtained as video streamed using the DASH protocol.

In some implementations, decoding the encoded video data includes obtaining the parameters from an MPEG transport stream. In these implementations, the parameters can encoded as descriptors in the transport stream, and the encoded video data can be obtained from the transport stream.

In some implementations, the processes 1800, 1900 discussed above can be implemented in a mobile device, such as a smart phone, tablet computer, laptop computer, personal digital assistant, or any other kind of computing device that can connect wireless to a network and/or that are small and light enough to be easily transported. In these implementations, the mobile device can include an omnidirectional camera for capturing 360-degree video. In some implementations, the mobile device can include a display for displaying 360-degree video.

In some examples, the processes 1800, 1900 may be performed by a computing device or an apparatus, such as the system discussed below with respect to FIG. 20. For example, the processes 1800, 1900 can be performed by the system 2000 and/or the storage 2008 or output 2010 shown in FIG. 20. In some cases, the computing device or apparatus may include a processor, microprocessor, microcomputer, or other component of a device that is configured to carry out the steps of the processes 1800, 1900 of FIG. 18 and FIG. 19. In some examples, the computing device or apparatus may include a camera configured to capture video data (e.g., a video sequence) including video frames. For example, the computing device may include a camera device (e.g., an omnidirectional camera, or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable type of data.

The processes 1800, 1900 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1800, 1900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Figure 20:
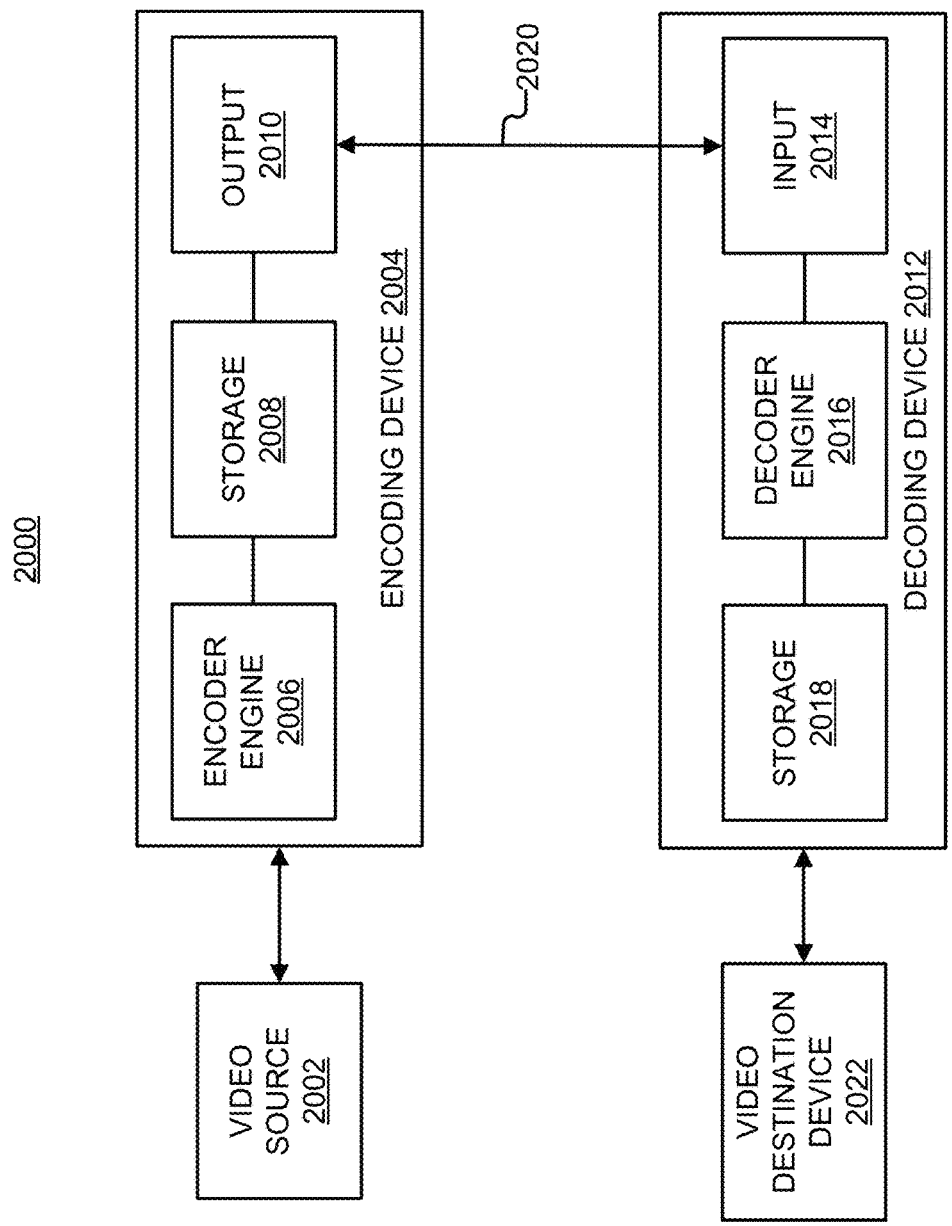
FIG. 20 is a block diagram illustrating an example of a system including an encoding device and a decoding device.

FIG. 20 is a block diagram illustrating an example of a system 2000 including an encoding device 2004 and a decoding device 2012. The encoding device 2004 may be part of a source device, and the decoding device 2012 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 2000 can support one-way or two-way video transmission to support applications such as video conferencing, video streaming, video playback, video broadcasting, gaming, and/or video telephony.

The encoding device 2004 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview video coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 2002 may provide the video data to the encoding device 2004. The video source 2002 may be part of the source device, or may be part of a device other than the source device. The video source 2002 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 2002 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 2002 may include one or more input pictures or frames. A picture or frame is a still image that is part of a video. The encoder engine 2006 (or encoder) of the encoding device 2004 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 2006 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 2006.

Once the pictures of the video data are partitioned into CUs, the encoder engine 2006 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with intra-prediction or inter-prediction. When the inter-prediction applies, the block is only predicted by one reference picture, and therefore reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 2004 may then perform transformation and quantization. For example, following prediction, the encoder engine 2006 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 2006. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 2006 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 2006 may form the TUs including the residual data for the CU, and may then transform the TUs to produce transform coefficients for the CU.

The encoder engine 2006 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 2006. In some examples, the encoder engine 2006 may utilize a predefined scan order to scan the quantized transform coefficients to produce a serialized vector that can be entropy encoded. In some examples, encoder engine 2006 may perform an adaptive scan. After scanning the quantized transform coefficients to form a vector (e.g., a one-dimensional vector), the encoder engine 2006 may entropy encode the vector. For example, the encoder engine 2006 may use context adaptive variable length coding, context adaptive binary arithmetic coding, syntax-based context-adaptive binary arithmetic coding, probability interval partitioning entropy coding, or another suitable entropy encoding technique.

The output 2010 of the encoding device 2004 may send the NAL units making up the encoded video bitstream data over the communications link 2020 to the decoding device 2012 of the receiving device. The input 2014 of the decoding device 2012 may receive the NAL units. The communications link 2020 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 2004 may store encoded video bitstream data in storage 2008. The output 2010 may retrieve the encoded video bitstream data from the encoder engine 2006 or from the storage 2008. Storage 2008 may include any of a variety of distributed or locally accessed data storage media. For example, the storage 2008 may include a hard drive, a storage disc, flash memory, volatile or non-volatile memory, or any other suitable digital storage media for storing encoded video data.

The input 2014 of the decoding device 2012 receives the encoded video bitstream data and may provide the video bitstream data to the decoder engine 2016, or to storage 2018 for later use by the decoder engine 2016. The decoder engine 2016 may decode the encoded video bitstream data by entropy decoding (e.g., using an entropy decoder) and extracting the elements of one or more coded video sequences making up the encoded video data. The decoder engine 2016 may then rescale and perform an inverse transform on the encoded video bitstream data. Residual data is then passed to a prediction stage of the decoder engine 2016. The decoder engine 2016 then predicts a block of pixels (e.g., a PU). In some examples, the prediction is added to the output of the inverse transform (the residual data).

The decoding device 2012 may output the decoded video to a video destination device 2022, which may include a display or other output device for displaying the decoded video data to a consumer of the content. In some aspects, the video destination device 2022 may be part of the receiving device that includes the decoding device 2012. In some aspects, the video destination device 2022 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 2012. This information is useful in improving the display or processing of the decoded output (e.g. such information could be used by decoder-side entities to improve the viewability of the content).

In some embodiments, the video encoding device 2004 and/or the video decoding device 2012 may be integrated with an audio encoding device and audio decoding device, respectively. The video encoding device 2004 and/or the video decoding device 2012 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 2004 and the video decoding device 2012 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

The video data captured by a camera (e.g., a fisheye camera or other omnidirectional camera) can be coded to reduce the amount of data needed for transmission and storage. Coding techniques may be implemented in an example video encoding and decoding system (e.g., system 2000). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

Figure 21:
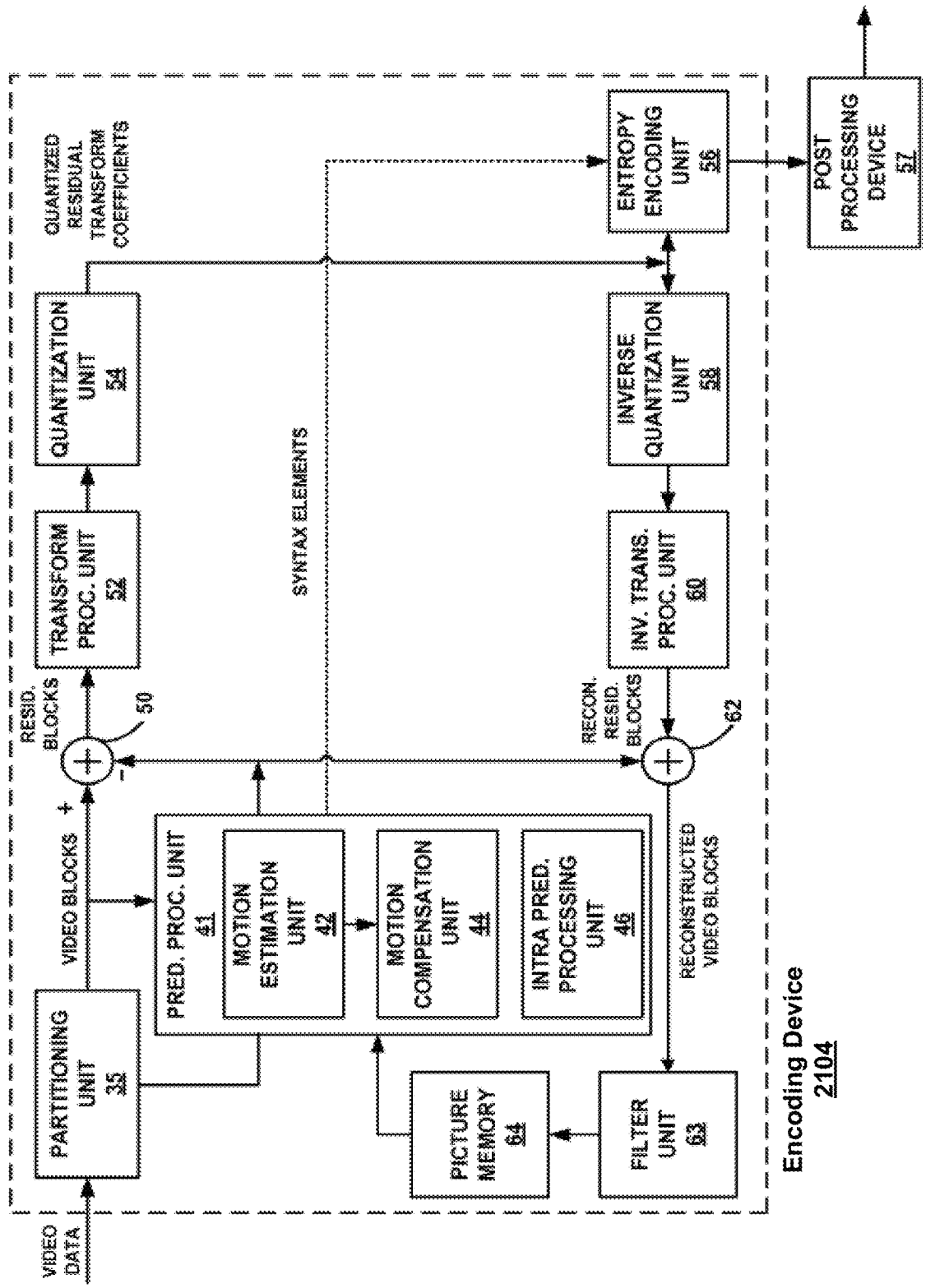
FIG. 21 is a block diagram illustrating an example encoding device.
Figure 22:
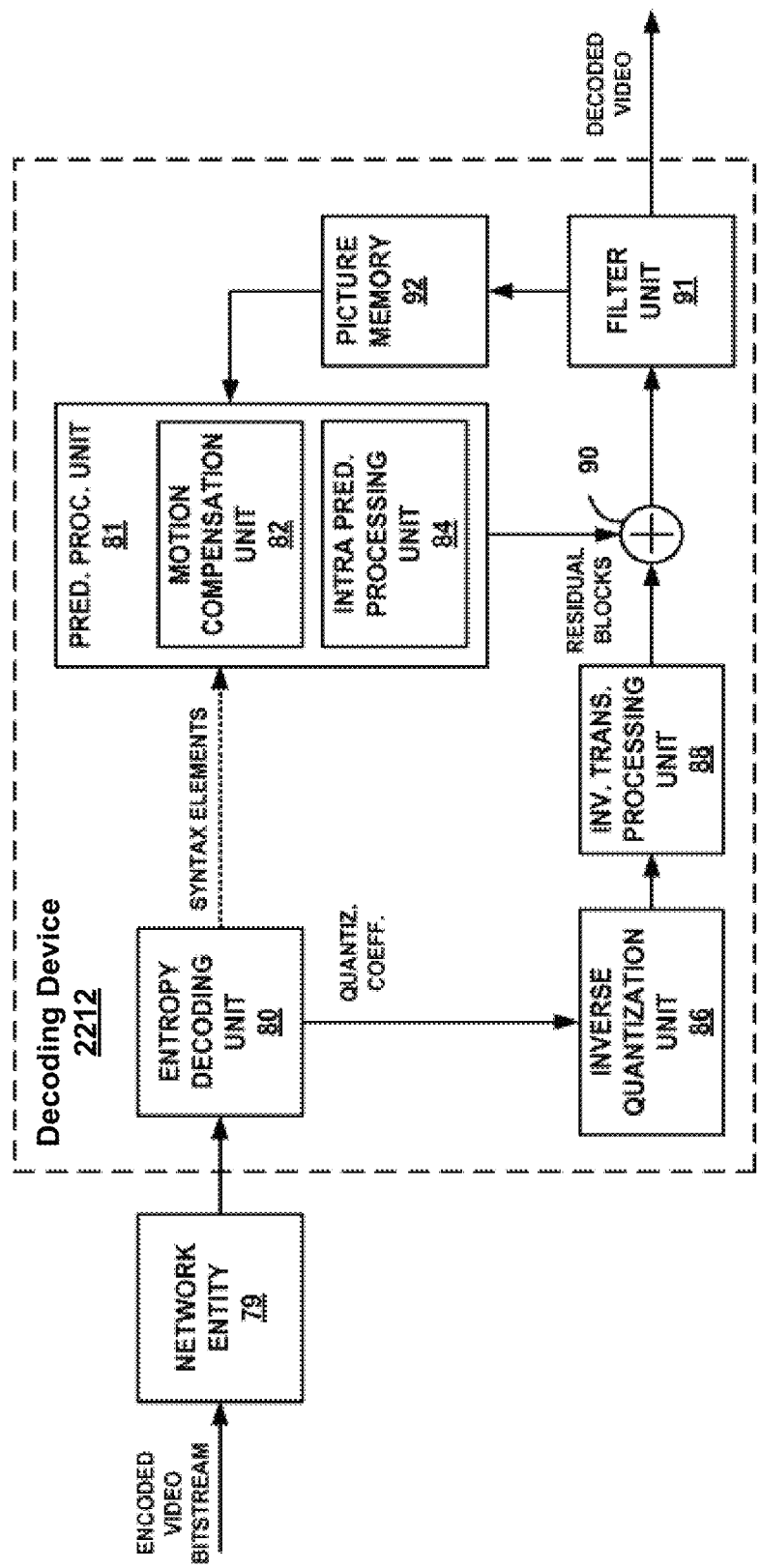
FIG. 22 is a block diagram illustrating an example decoding device.

Specific details of the encoding device 2104 and the decoding device 2212 are shown in FIG. 21 and FIG. 22, respectively. FIG. 21 is a block diagram illustrating an example encoding device 2104 that may implement one or more of the techniques described in this disclosure. Encoding device 2104 may, for example, generate the syntax structures described herein (e.g., the syntax structures of a VPS, SPS, PPS, or other syntax elements). Encoding device 2104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 2104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 2104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 21 as being an in loop filter, in other configurations, filter unit 63 may be implemented as a post loop filter. A post processing device 57 may perform additional processing on encoded video data generated by encoding device 2104. The techniques of this disclosure may in some instances be implemented by encoding device 2104. In other instances, however, one or more of the techniques of this disclosure may be implemented by post processing device 57.

As shown in FIG. 21, encoding device 2104 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 2104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 2104 may calculate values for sub-integer pixel positions of reference pictures stored in picture memory 64. For example, encoding device 2104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identifies one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 2104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 2212 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 2104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 2104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce the bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 2212, or archived for later transmission or retrieval by decoding device 2212. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 2104 of FIG. 21 represents an example of a video encoder configured to generate syntax for an encoded video bitstream. Encoding device 2104 may, for example, generate VPS, SPS, and PPS parameter sets as described above. The encoding device 2104 may perform any of the techniques described herein, including the processes described above with respect to FIG. 21 and FIG. 22. The techniques of this disclosure have generally been described with respect to encoding device 2104, but as mentioned above, some of the techniques of this disclosure may also be implemented by post processing device 57.

FIG. 22 is a block diagram illustrating an example decoding device 2212. The decoding device 2212 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra-prediction processing unit 84. Decoding device 2212 may, in some examples, perform a decoding pass generally reciprocal to the encoding pass described with respect to encoding device 2104 from FIG. 21.

During the decoding process, decoding device 2212 receives an encoded video bitstream that represents video blocks of an encoded video slice and associated syntax elements sent by encoding device 2104. In some embodiments, the decoding device 2212 may receive the encoded video bitstream from the encoding device 2104. In some embodiments, the decoding device 2212 may receive the encoded video bitstream from a network entity 79, such as a server, a media-aware network element (MANE), a video editor/splicer, or other such device configured to implement one or more of the techniques described above. Network entity 79 may or may not include encoding device 2104.

Some of the techniques described in this disclosure may be implemented by network entity 79 prior to network entity 79 transmitting the encoded video bitstream to decoding device 2212. In some video decoding systems, network entity 79 and decoding device 2212 may be parts of separate devices, while in other instances, the functionality described with respect to network entity 79 may be performed by the same device that comprises decoding device 2212.

The entropy decoding unit 80 of decoding device 2212 entropy decodes the bitstream to generate quantized coefficients, motion vectors, and other syntax elements. Entropy decoding unit 80 forwards the motion vectors and other syntax elements to prediction processing unit 81. Decoding device 2212 may receive the syntax elements at the video slice level and/or the video block level. Entropy decoding unit 80 may process and parse both fixed-length syntax elements and variable-length syntax elements in one or more parameter sets, such as VPS, SPS, and PPS sets.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 2212 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 2104 during encoding of the video blocks to calculate interpolated values for sub-integer pixels of reference blocks. In this case, motion compensation unit 82 may determine the interpolation filters used by encoding device 2104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 2104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 2212 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 22 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 2022 shown in FIG. 20.

In the foregoing description, aspects of the application are described with reference to specific embodiments thereof, but those skilled in the art will recognize that the present disclosure is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, perform one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an File Transfer Protocol (FTP) server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as Dynamic Adaptive Streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

What is claimed is:

1. A method of processing video data, comprising:
obtaining 360-degree video data captured by an omnidirectional camera, wherein a video frame of the 360-degree video data comprises an image that includes a scene, and wherein, in the image, the scene is warped into a circular region of the image;
obtaining parameter values associated with the omnidirectional camera, wherein the parameter values include: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels;
encoding the 360-degree video data, wherein encoding includes encoding the circular region of the image; and
generating encoded video data, wherein the encoded video data includes the encoded 360-degree video data and the parameter values associated with the omnidirectional camera.

2. The method of claim 1, further comprising writing the encoded 360-degree video data to a file, and wherein the file is formatted according to an International Standards Organization Base Media File Format (ISOBMFF) format.

3. The method of claim 2, wherein the parameter values are included at a file level, a movie level, or at a track level.

4. The method of claim 2, wherein one or more of the parameter values are included in a restricted scheme information box that includes an original sample entry type,
wherein the original sample entry type identifies an original format of the 360-degree video data as captured, and
wherein the parameter values describe a mapping of the 360-degree video data from the original format as captured to an equirectangular format or a spherical format.

5. The method of claim 1, further comprising:
encoding the parameter values into one or more Supplemental Enhancement Information (SEI) messages, wherein the one or more SEI message are included in the encoded 360-degree video data.

6. The method of claim 5, wherein the one or more SEI messages are formatted according to an Advanced Video Coding (AVC) or High-Efficiency Video Code (HEVC) standard.

7. The method of claim 1, further comprising encoding the parameter values as Session Data Protocol (SDP) attributes.

8. The method of claim 1, further comprising writing the parameter values into a Media Presentation Description (MPD) file.

9. The method of claim 1, further comprising writing the parameter values into a Motion Pictures Experts Group (MPEG) transport stream.

10. An apparatus for processing encoded video, comprising:
a memory configured to store 2-dimensional video data captured by an omnidirectional camera; and a processor implemented in circuitry and configured to:
obtain 360-degree video data captured by an omnidirectional camera, wherein a video frame of the 360-degree video data comprises an image that includes a scene, and wherein, in the image, the scene is warped into a circular region of the image;
obtain parameter values associated with the omnidirectional camera, wherein the parameter values include: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels;
encode the 360-degree video data including the circular region of the image; and
generate encoded video data, wherein the encoded video data includes the encoded 360-degree video data and the parameter values associated with the omnidirectional camera.

11. The apparatus of claim 10, wherein generating the encoded video data includes writing the encoded 360-degree video data to a file, and wherein the file is formatted according to an International Standards Organization Base Media File Format (ISOBMFF) format.

12. The apparatus of claim 11, wherein the parameter values are included at a file level, a movie level, or at a track level.

13. The apparatus of claim 11, wherein one or more of the parameter values are included in a restricted scheme information box that includes an original sample entry type,
wherein the original sample entry type identifies an original format of the 360-degree video data as captured, and
wherein the parameter values describe a mapping of the 360-degree video data from the original format as captured to an equirectangular format or a spherical format.

14. The apparatus of claim 10, wherein the processor is further configured to:
encode the parameter values into one or more Supplemental Enhancement Information (SEI) messages, wherein the one or more SEI message are included in the encoded 360-degree video data.

15. The apparatus of claim 14, wherein the one or more SEI messages are formatted according to an Advanced Video Coding (AVC) or High-Efficiency Video Code (HEVC) standard.

16. The apparatus of claim 10, wherein generating the encoded video data includes encoding the parameter values as Session Data Protocol (SDP) attributes.

17. The apparatus of claim 10, wherein generating the encoded video data includes writing the parameter values into a Media Presentation Description (MPD) file.

18. The apparatus of claim 10, wherein generating the encoded video data includes writing the parameter values into a Motion Pictures Experts Group (MPEG) transport stream.

19. The apparatus of claim 10, further comprising:
a mobile device, wherein the mobile device includes the omnidirectional camera.

20. A non-transitory computer-readable medium having stored thereon instructions that, when executed by one or more processors, cause the one or more processors to:
obtain 360-degree video data captured by an omnidirectional camera, wherein a video frame of the 360-degree video data comprises an image that includes a scene, and wherein, in the image, the scene is warped into a circular region of the image;
obtain parameter values associated with the omnidirectional camera, wherein the parameter values include: a quantity of circular regions in the image, a value that identifies a horizontal coordinate of a center of the circular region, a value that identifies a vertical coordinate of the center of the circular region, a full radius value, a scene radius value, a field-of-view a value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels;
encode the 360-degree video data including the circular region of the image; and
generate encoded video data, wherein the encoded video data includes the encoded 360-degree video data and the parameter values associated with the omnidirectional camera.

21. An apparatus, comprising:
means for obtaining 360-degree video data captured by an omnidirectional camera, wherein a video frame of the 360-degree video data comprises an image that includes a scene, and wherein, in the image, the scene is warped into a circular region of the image;
means for obtaining parameter values associated with the omnidirectional camera, wherein the parameter values include: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels;
means for encoding the 360-degree video data including the circular region of the image; and
means for generating encoded video data, wherein the encoded video data includes the encoded 360-degree video data and the parameter values associated with the omnidirectional camera.

22. A method of processing video data, comprising:
obtaining encoded video data, wherein the encoded video data includes encoded 360-degree video data captured by an omnidirectional camera and parameter values associated with the omnidirectional camera;
decoding the encoded video data to produce 360-degree video data, wherein a video frame from the 360-degree video data comprises an image that includes a scene, wherein, in the image, the scene is warped into a circular region of the image;

determining the parameter values, the parameter values including: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels; and generating a 360-degree video presentation, wherein generating the 360-degree video presentation includes using the parameter values to map the circular region to a format that can be used in a 360-degree video presentation.

23. The method of claim 22, further comprising:
mapping the circular region into an equirectangular format; and
using the equirectangular format for the 360-degree video presentation.

24. The method of claim 22, further comprising:
mapping the circular region directly into a 360-degree format; and
using the 360-degree format for the 360-degree video presentation.

25. The method of claim 22, wherein the encoded video data is obtained from a file, wherein the file is formatted according to an International Standards Organization Base Media File Format (ISOBMFF) format.

26. The method of claim 25, wherein the parameter values are included at a file level, a movie level, or at a track level.

27. The method of claim 25, wherein one or more of the parameter values are included in a restricted scheme information box that includes an original sample entry type,
wherein the original sample entry type identifies an original format of the 360-degree video data as captured, and
wherein the parameter values describe a mapping of the 360-degree video data from the original format as captured to an equirectangular format or a spherical format.

28. The method of claim 22, further comprising:
decoding the parameter values from one or more Supplemental Enhancement Information (SEI) messages, wherein the one or more SEI messages are included in the encoded video data.

29. The method of claim 28, wherein the one or more SEI messages are formatted according to an Advanced Video Coding (AVC) or High-Efficiency Video Code (HEVC) standard.

30. The method of claim 22, further comprising obtaining the parameter values from Session Data Protocol (SDP) attributes.

31. The method of claim 22, further comprising obtaining the parameter values from a Media Presentation Description (MPD) file.

32. The method of claim 22, further comprising obtaining the parameter values from a Motion Pictures Experts Group (MPEG) transport stream.

33. An apparatus for processing encoded video, comprising:
a memory configured to store 2-dimensional video data captured by an omnidirectional camera; and
a processor implemented in circuitry and configured to:
obtain encoded video data, wherein the encoded video data includes encoded 360-degree video data captured by an omnidirectional camera and parameter values associated with the omnidirectional camera;
decode the encoded video data to produce 360-degree video data, wherein a video frame from the 360-degree video data comprises an image that includes a scene, wherein, in the image, the scene is warped into a circular region of the image;
determine the parameter values, the parameter values including: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels;
use the parameter values to map the circular region to a format that can be used in a 360-degree video presentation; and
generate the 360-degree video presentation.

34. The apparatus of claim 33, wherein the processor is further configured to:
map the circular region into an equirectangular format; and
use the equirectangular format for the 360-degree video presentation.

35. The apparatus of claim 33, wherein the processor is further configured to:
map the circular region directly into a 360-degree format; and
use the 360-degree format for the 360-degree video presentation.

36. The apparatus of claim 33, wherein the encoded video data is obtained from a file, wherein the file is formatted according to an International Standards Organization Base Media File Format (ISOBMFF) format.

37. The apparatus of claim 36, wherein the parameter values are included at a file level, a movie level, or at a track level.

38. The apparatus of claim 36, wherein one or more of the parameter values are included in a restricted scheme information box that includes an original sample entry type,
wherein the original sample entry type identifies an original format of the 360-degree video data as captured, and
wherein the parameter values describe a mapping of the 360-degree video data from the original format as captured to an equirectangular format or a spherical format.

39. The apparatus of claim 33, wherein the processor is further configured to:
decode the parameter values from one or more Supplemental Enhancement Information (SEI) messages, wherein the one or more SEI messages are included in the encoded video data.

40. The apparatus of claim 39, wherein the one or more SEI messages are formatted according to an Advanced Video Coding (AVC) or High-Efficiency Video Code (HEVC) standard.

41. The apparatus of claim 33, wherein the processor is further configured to obtain the parameter values from Session Data Protocol (SDP) attributes.

42. The apparatus of claim 31, wherein the processor is further configured to obtain the parameter values from a Media Presentation Description (MPD) file.

43. The apparatus of claim 31, wherein the processor is further configured to obtain the parameter values from a Motion Pictures Experts Group (MPEG) transport stream.

44. The apparatus of claim 31, wherein the apparatus is a mobile device including a display configured to display the 360-degree video presentation.

45. A non-transitory computer-readable medium having stored thereon instructions that, when executed by one or more processors, cause the one or more processors to:
   obtain encoded video data, wherein the encoded video data includes encoded 360-degree video data captured by an omnidirectional camera and parameter values associated with the omnidirectional camera;
   decode the encoded video data to produce 360-degree video data, wherein a video frame from the 360-degree video data comprises an image that includes a scene, wherein, in the image, the scene is warped into a circular region of the image;
   determine the parameter values, the parameter values including: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels; and
   generate a 360-degree video presentation,
   wherein the instructions that, when executed by the one or more processors, cause the one or more processors to generate the 360-degree video presentation include instructions that, when executed by the one or more processors, cause the one or more processors to use the parameter values to map the circular region to a format that can be used in the 360-degree video presentation.

46. An apparatus, comprising:
   means for obtaining encoded video data, wherein the encoded video data includes encoded 360-degree video data captured by an omnidirectional camera and parameter values associated with the omnidirectional camera;
   means for decoding the encoded video data to produce 360-degree video data, wherein a video frame from the 360-degree video data comprises an image that includes a scene, wherein, in the image, the scene is warped into a circular region of the image;
   means for determining the parameter values, the parameter values including: a quantity of circular regions in the image, a value that identifies a horizontal coordinate of a center of the circular region, a value that identifies a vertical coordinate of the center of the circular region, a full radius value, a scene radius value, a field-of-view value, a value indicating a quantity of deadzone areas within the image that include unusable pixels, one or more values indicating a position of a deadzone area within the image that includes at least a portion of the unusable pixels, and one or more values indicating a size of the deadzone area within the image that includes at least the portion of the unusable pixels; and
   means for generating a 360-degree video presentation, wherein the means for generating the 360-degree video presentation includes means for using the parameter values to map the circular region to a format that can be used in a 360-degree video presentation.

* * * * *